United States Patent
Kolomitsyn et al.

(10) Patent No.: US 9,561,489 B2
(45) Date of Patent: *Feb. 7, 2017

(54) PARTICULATE SORPTION MEDIUM PREPARED FROM PARTIALLY DECOMPOSED ORGANIC MATTER

(71) Applicants: American Peat Technology, LLC, Aitkin, MN (US); Regents of the University of Minnesota, Minneapolis, MN (US)

(72) Inventors: Igor V. Kolomitsyn, Duluth, MN (US); Peggy Wallgren Jones, Aitkin, MN (US); Douglas A. Green, Crosby, MN (US)

(73) Assignees: American Peat Technology, LLC, Aitkin, MN (US); Regents of the University of Minnesota, Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/213,677

(22) Filed: Mar. 14, 2014

(65) Prior Publication Data
US 2014/0306148 A1 Oct. 16, 2014

Related U.S. Application Data

(63) Continuation-in-part of application No. 13/841,526, filed on Mar. 15, 2013.

(51) Int. Cl.
*B01J 20/20* (2006.01)
*B01J 20/30* (2006.01)

(52) U.S. Cl.
CPC ............. *B01J 20/3078* (2013.01); *B01J 20/20* (2013.01)

(58) Field of Classification Search
CPC ............. B01J 39/24; B01J 39/36; B01J 20/22; B01J 20/3078
See application file for complete search history.

(56) References Cited

U.S. PATENT DOCUMENTS 3,307,934 A 3/1967 Palmer
4,671,802 A 6/1987 Jonsson
(Continued)

FOREIGN PATENT DOCUMENTS

GB WO 9422768 A1 * 10/1994 ............. C02F 1/286
RU 2116128 7/1998
(Continued)

OTHER PUBLICATIONS

Fine, Pinchas, et al. "Practical and mechanistic aspects of the removal of cadmium from aqueous systems using peat." Environmental pollution 138.2 (2005): 358-367.*

(Continued)

*Primary Examiner* — Richard M Rump
(74) *Attorney, Agent, or Firm* — DeWitt Ross & Stevens SC

(57) ABSTRACT

A process for the preparation from a partially decomposed organic material like peat a granulated or pelletized sorption medium using low-temperature, thermal activation of the sorption medium to produce a high degree of granule or pellet hardness balanced against an efficacious level of ion-exchange and adsorption capacity, followed by chemical treatment of the thermally-activated sorption material via an acid solution and a salt solution to increase its ion-exchange and adsorption performance while minimizing the transfer of natural impurities found in the sorption medium to an aqueous solution is provided by this invention. The sorption medium of this invention can be used in a variety of aqueous solution treatment processes, such as wastewater treatment.

45 Claims, 7 Drawing Sheets

(56) References Cited

U.S. PATENT DOCUMENTS

| | | |
|---|---|---|
| 4,778,602 A | 10/1988 | Allen, III |
| 4,861,481 A | 8/1989 | Allen, III |
| 5,314,638 A | 5/1994 | Morine et al. |
| 5,494,649 A * | 2/1996 | Fristad .................. B03B 5/00 423/27 |
| 5,578,547 A | 11/1996 | Summers, Jr. et al. |
| 5,602,071 A | 2/1997 | Summers, Jr. et al. |
| 5,624,576 A | 4/1997 | Lenhart et al. |
| 6,042,743 A | 3/2000 | Clemenson |
| 6,143,692 A | 11/2000 | Sanjay et al. |
| 6,287,496 B1 | 9/2001 | Lownds |
| 6,316,378 B1 | 11/2001 | Giebelhausen et al. |
| 6,429,171 B1 | 8/2002 | Clemenson |
| 6,455,149 B1 | 9/2002 | Hagen et al. |
| 6,998,038 B2 | 2/2006 | Howard |
| 8,232,225 B2 | 7/2012 | Green et al. |
| 2003/0041734 A1 | 3/2003 | Funke et al. |
| 2007/0167310 A1 | 7/2007 | Green et al. |

FOREIGN PATENT DOCUMENTS

| | | |
|---|---|---|
| RU | 2173578 | 9/2001 |
| SU | 806615 | 2/1981 |
| SU | 1142160 | 11/1983 |

OTHER PUBLICATIONS

Kalmykova, Yuliya, Ann-Margret Strömvall, and Britt-Marie Steenari. "Adsorption of Cd, Cu, Ni, Pb and Zn on Sphagnum peat from solutions with low metal concentrations." Journal of hazardous materials 152.2 (2008): 885-891.*

Durusoy et al., "Pyrolysis Kinetics of Blends of Gediz Lignite with Denizli Peat," Energy Sources, vol. 23, pp. 393-399 (2001) Ankara, Turkey.

Corneliu Caramalau et al., "Kinetic Study of Cobalt (II) Adsorption on Peat Activated by Simple Chemical Treatments," Environmental Engineering & Management Journal, vol. 8 No. 6, pp. 1351-1358 (2009) Iasi, Romania.

* cited by examiner

PARTICULATE SORPTION MEDIUM PREPARED FROM PARTIALLY DECOMPOSED ORGANIC MATTER

CROSS-REFERENCE TO RELATED APPLICATIONS

This application is a continuation-in-part of U.S. Ser. No. 13/841,526 filed on Mar. 15, 2013 entitled "Particulate Sorption Medium Prepared from Partially Decomposed Organic Matter," which is hereby incorporated by reference.

FIELD OF THE INVENTION

This invention relates generally to particulate sorption media prepared from partially decomposed organic matter like peat, and more specifically to granules made from such material that are thermally activated and chemically modified to provide them the requisite hardness and sorption capacity for removing undesirable impurities from aqueous solutions without introducing chemical contaminants naturally found in the organic material into the aqueous solution.

BACKGROUND OF THE INVENTION

Many industrial manufacturers also face the problem of wastewaters containing heavy metals like arsenic, lead, mercury, cadmium, iron, and aluminum that are produced by their manufacturing process. Circuit board manufacturers, metal finishers, automotive, aerospace, and semiconductor manufacturing, electroplated metal parts/washing, textile dyes, and steel are prime contributors. If dissolved in heavy-enough concentrations in the wastewater stream, they become toxic when they are not metabolized by the body, and accumulate instead in the soft tissues. Heavy metal toxicity can result in damaged or reduced mental and central nervous function, learning disabilities, diminished energy levels, cancers, damage to blood composition, lungs, kidneys, liver, and other vital organs, and even death. Other heavy metals of concern include antimony, chromium, cobalt, copper, manganese, nickel, uranium, vanadium, and zinc.

It is therefore necessary for manufacturers to treat these industrial wastewater streams to reduce these heavy metals to acceptable levels before they are introduced into water streams and water bodies that are subject to environmental government laws and regulations. As a result of improper treatment prior to discharge, many heavy metals have been found to exist at harmful levels in ground waters which are destined for potable drinking water. Agricultural, meat packing, mining, and hydrofracking industries also face particular risks of waste water contamination.

A "solution" represents a mixture of two or more individual substances that cannot be separated by a mechanical means, such as filtration. For example, a liquid solution occurs when a liquid, solid, or gas solute is dissolved in a liquid solvent. The liquid solution constitutes an aqueous solution if the solvent is water. Wastewater streams very often constitute aqueous solutions containing one or more contaminants.

Chemical Water Treatment Methods

Chemical treatment methods are known in the industry for processing wastewater streams. In one common method, the wastewater is treated with a caustic agent like hydroxide to adjust the pH of the water so that the metals form insoluble precipitates. A coagulant in the form of an organic ferric chloride or ferrous sulfate is then added to the water to promote settling of the metal hydroxide precipitates. The precipitate particles settle into sedimentation tanks. A filtration medium like silica sand, diatomaceous earth, carbon, or cloth is then used to capture the remaining metal hydroxide found in the water. But, this process requires very large volumes of chemicals, as well as land-filling or treatment of the resulting toxic metal sludges.

Non-Chemical Water Treatment Methods

Non-chemical treatments of wastewater generally employ a mechanism known as "sorption." Sorption can involve both chemical and physical processes, but the end result is the transfer of a substance from one phase to another. In other words, sorption is the movement of toxins and contaminants from the dissolved, aqueous phase to the surface of a solid media. Three different types of sorption predominate wastewater treatment technology: ion-exchange, absorption and adsorption.

Ion exchange is a separation process widely used in the food and beverage, hydrometallurgical, metals finishing, chemical and petrochemical, pharmaceutical, sugar and sweetness, ground and potable water, nuclear, softening and industrial water, semiconductors, power, and many other industries. Aqueous and other ion-containing solutions can be purified, separated, and decontaminated by swapping targeted ions contained in the solution with substitute ions typically provided by ion exchange resins or other substrates.

But ion exchange is also a proven technology for removing dissolved metals or other impurities from these wastewater streams. It represents a reversible process in which the ionized metal or other impurity compound or element changes place with another ionized compound or element on the surface of a medium like an ion exchange resin.

Ion exchange can produce high-purity water (including softening, deionizing, water recycling, and removal of heavy metals) from the wastewater. In a familiar example to many readers, an ion exchange-based water softener works by passing hard water naturally containing an abundance of calcium and magnesium cations through a volume of resin beads containing sodium ions on their active sites. During contact, the calcium and magnesium cations will preferentially migrate out of solution to the active sites on the resin, being replaced in solution by the available sodium ions. This process reaches equilibrium with a much lower concentration of calcium and magnesium cations in solution, thereby "softening" the water. The resin can be recharged periodically by washing it with a solution containing a high concentration of sodium ions, such as a sodium chloride solution. The calcium and magnesium cations accumulated on the resin will migrate off it, being replaced by the sodium ions from the salt solution until a new equilibrium state is reached.

Synthetic ion exchange resins are typically used within ion exchange processes. These synthetic resins commonly are formed of small 0.03-2.0 mm beads made from an organic polymer substrate, such as cross-linked styrene and divinylbenzene copolymers. Moreover, these resin beads will feature a highly developed structure of pores on the surface of the resin, which provide the sites for trapping and releasing ions. These resin beads can be converted to cation-exchange resins through sulfonation, or to anion-exchange resins through chloromethylation.

In wastewater treatment, these ion exchange resins remove the heavy metals from the solution, and replace them with less harmful elements like potassium or sodium. But, this process for producing synthetic resins is expensive. The resin beads are also highly susceptible to "fouling." While soluble organic acids and bases removed by the synthetic ion-exchange resin are shed during regeneration, non-ionic organic materials, oils, greases, and suspended solids also removed from the water tend to remain on the surface of the resin bead. Foulants can form rapidly on the resin, and can significantly hinder performance of the ion-exchange system. Cationic polymers and other high molecular weight cationic organics are particularly troublesome at any concentration. For certain types of resins, even one ppm suspended solids can cause significant fouling of the resin beads over time. Thus, a prefiltration unit in the form of activated carbon or other separation material may need to be positioned upstream of the ion-exchange unit to remove these organic contaminants before the wastewater is passed through the ion exchange resin, further complicating the water treatment process and its costs. The costs associated with this pretreatment can be substantial.

Additionally, resins require regeneration once the ion-exchange site have been exhausted, for example, as feed-water flows through a bed. During regeneration of a cationic resin, metal cations that were previously adsorbed from the wastewater flow, are replaced on the resin beads by hydrogen ions. A step known as "backwash" is often employed during regeneration, so that any organic contaminant buildup in the resin can be relieved, thereby allowing free flow of the wastewater through the resin beads. But, chemically-regenerated ion-exchange processes known in the art tend to use excessive amounts of regeneration chemicals, which require periodic and even on-going treatment, as well as safe disposal of the chemical waste. These processes can be complex and expensive to operate.

Another "sorption" separation process is absorption. This is a physical or chemical phenomenon or process in which atoms, molecules, or ions enter some bulk phase, whether it be a gas, liquid, or solid material. The gas, liquid or solid material takes in the other substance, like a sponge soaking in water. But absorption is necessarily limited by the physical capacity of the absorbent substrate, and can require frequent purges of the taken-up substance to replenish the absorbent capacity of the substrate.

Yet another sorption process is adsorption. This represents a process in which atoms, ions, or molecules from a gas, liquid, or dissolved solid adhere to the surface of a substrate. This constitutes a surface-based separation process, instead of absorption which involves the whole volume of the substrate material. Like ion exchange, in adsorption certain adsorbates are selectively transferred from the fluid phase to the surface of insoluble, rigid particles.

Activation of Carbon-Based Media

"Activation" is the process of treating a material that is high in carbon for purposes of increasing surface area and creating porosity. Materials can be activated either with chemical treatment followed by a thermal step, or with heat treatment alone. Most commonly, carbon materials that have been activated then undergo further chemical treatment in order to change the activity of the surface of the carbon-based material.

Activated carbon substrates have been employed in the water filtration industry for this adsorption separation process. Unlike synthetic polymer resins used in ion exchange processes, these activated carbon materials constitute a form of carbon that has been processed to make it extremely porous with a resulting very large surface area for adsorption of impurities via van der Waals forces or London dispersion forces, or chemical reactions. Due to its high degree of microporosity, just one gram of activated carbon substrate can provide a surface area exceeding 500 $m^2$ (about one tenth the size of a football field). Moreover, such activated carbon materials can be produced from a variety of natural organic materials like vegetable matter, soft woods, cornstalks, bagasse, nut hulls and shells, various animal products, lignite, bituminous, or anthracite coals, straw, petroleum pitch, or peat.

Chemical Activation

When some of the energy required for a reaction is provided by a preceding exothermic chemical reaction, there is said to be a "chemical activation." Carbonaceous material may be chemically activated by impregnating it with an acid, strong base or a salt like phosphoric acid, sulfuric acid, potassium hydroxide, sodium hydroxide, calcium chloride, or zinc chloride, followed by carbonization via pyrolysis at a high 450-900° C. temperature range. For example peat can be impregnated with phosphoric acid or zinc chloride mixed into a paste, and then pyrolyzed at 500-800° C. to activate the peat, followed by washing, drying, and grinding this chemically activated peat into a powder to produce activated carbon having a very open porous structure that is ideal for adsorption of large molecules.

For example, Soviet Published Patent Application No. 1,142,160 filed by Sokolov et al. discloses an active adsorbent product made from aluminum salt sludge. Organo-aluminum sludge produced in the process of coagulation of aluminum salts in water is thickened to create a concentration of 10-17%. The aluminum hydroxide fraction is used to precipitate out the organic compounds during a process that is called coagulation. The aluminum hydroxide and organic compounds are then treated with sulfuric acid, and then the solid phase is heated at 210-270° C. for 2-4 minutes. This process destroys the organic material to convert it into activated carbon, and some portion of organic material is reacted with sulfuric acid to produce sulfonic acid derivatives. The end product is used to remove organic compounds and metal cations (e.g., nickel and cobalt) from waste water. But, not only does Sokolov use a non-natural starting material, but also he relies upon a combination of chemical activation to produce activated carbon, and chemical modification to produce the $SO_3^-$ groups on the surface of the product necessary for yielding its cation-exchange properties.

Physical Activation

Alternatively, carbonaceous sources such as coconut hulls or bamboo can be physically activated by exposing it to an oxidizing atmosphere like carbon dioxide, oxygen, or steam at a very high temperature falling with the 650-1200° C. range. These processes for producing activated carbon do not produce a media with a usable ion-exchange capacity. As an example, U.S. Pat. No. 6,316,378 issued to Giebelhausen et al. discloses the manufacture of shaped activated carbon pellets. Polymer resin, acetylene coke, or pearl cellulose are dried at 250-300° C. Then Giebelhausen carbonizes his material at a very high 850-880° C. temperature without steam. Finally, he thermally activates his carbon pellet product at an even higher 910-915° C. temperature in a hot gas-fired kiln. Steam is used by Giebelhausen merely to prevent explosions.

In another example, U.S. Published Application 2003/0041734 filed by Funke et al., shows a method for producing an ultra-low emission ("ULE") carbon material. The Funke reference explains that conventional activated carbon materials contain too much water and carbon dioxide constituents to effectively adsorb water and carbon dioxide molecules from a gas stream in need of purification. Therefore, Funke subjects activated carbon with no ion exchange capacity to extremely high temperatures and time in a reactor in order to drive off all the $H_2O$ and $CO_2$ molecules from the activated carbon. This "preconditioned" ULE carbon material is then further treated to a second activation process under the flow of an ultra-dried reactive purge gas like ammonia to remove any additional moisture from the ULE carbon material. Devoid of $H_2O$ and $CO_2$ molecules, this processed carbon material can readily adsorb new $H_2O$ and $CO_2$ molecules from the gas stream by simple adsorption without any ion exchange reaction. Furthermore, such treatment conditions are on the order of 500-700° C. for 24 hours to 5 days. Indeed, these are extreme conditions that in no way resemble normal physical activation.

Pyrolysis of Peat

"Pyrolysis" is related to activation in that material high in carbon content is exposed to heat. Activation often involves pyrolysis, but the end result is to produce a product with increased surface area. Pyrolysis constitutes the decomposition of organic material through heating, and it occurs in an oxygen-free environment.

Peat is a substance that can be pyrolyzed, and comparative studies of the pyrolysis kinetics for coal and peat have been performed. See Durusoy et al., "Pyrolysis Kinetics of Blends of Gediz Lignite with Denizli Peat," *Energy Sources*, vol. 23, pp. 393-99 (2001). But, no particular temperature ranges for pyrolysis were determined in this study, nor was any ion-exchange medium prepared.

Common uses of Activated Carbon

Activated carbon filters are popular for home and small-volume water purification systems, because of the absorbency of the carbon substance. Activated carbons are known to have a heterogeneous pore structure, which is classified as microporous (diameter of pore <2 nm), mesoporous (diameter of pore between 2-50 nm), and macroporous (diameter of pores >100 mm). Activated carbons have a large adsorption capacity, preferably for small molecules, and are used for purification of liquids and gases. Volatile organic chemicals found in the water are removed via adsorption. But, activated carbon filters are generally not successful in removing dissolved metals like antimony, arsenic, barium, beryllium, cadmium, chromium, copper, mercury, nickel, and selenium from the water. Moreover, the purification efficiency of activated carbon filters is directly influenced by the amount of carbon contained in the filter unit, the amount of time that the water-borne contaminant spends in contact with the carbon, and the contaminant particle size. Hence, activated carbon filters must necessarily contain very large carbon volumes treating very low water flow rates, which makes them comparatively unsuitable for processing industrial wastewater streams.

Peat-Based Sorption Media

It would therefore be desirable to produce a sorption medium from a natural, organic material. However, a balance must be struck between the physical integrity of the form of the sorption medium versus the ability of the medium to serve as an ion-exchanger, adsorbent, or absorbent. Partially decomposed organic starting material like peat inherently possess ion-exchange and adsorbent characteristics. Peat is composed mainly of marshland vegetation, trees, grasses, fungi, as well as other types of residual organic material such as insects and animal remains, and is inhibited from decaying fully by acidic and anaerobic conditions. It is also abundant in many places in the world. For example, 15% of Minnesota is covered by valuable peat resources, comprising 35% of the total peat deposits found in the lower 48 states in the U.S.

Pellets made from peat are known within the industry. For example, U.S. Pat. No. 6,455,149 issued to Hagen et al. discloses a process for producing peat pellets from an admixture of peat moss, pH adjusting agent, wetting agent, and other processing additives. The resulting granules can be easily broadcast spread on the ground, and returned to their original peat moss form upon wetting to act as a fertilizer. No effort is made by Hagen to activate his pellets to prepare the adsorption or absorption or ion exchange characteristics of their surface, nor are they used as an ion exchange medium. U.S. Pat. No. 3,307,934 issued to Palmer, et al. shows another fertilizer product containing peat, and water-soluble inorganic fertilizer salt like diammonium phosphate, sulfate of potash, or urea. This peat product likewise is not activated, nor is it used as an ion-exchange or adsorption medium. Instead, Palmer uses peat merely as a carrier for his fertilizer salt.

It is also known in the wastewater treatment industry to use pellets made from natural organic materials as a pollution filtering medium. For instance, U.S. Pat. No. 5,624,576 issued to Lenhart et al. illustrates pellets made from leaf compost, which are then employed to remove pollutants from storm water. U.S. Pat. No. 6,143,692 issued to Sanjay et al. discloses an adsorbent made from cross-linked solubilized humic acid, which can be employed for removing heavy metals from water solutions. U.S. Pat. No. 6,998,038 issued to Howard contains a detailed disclosure of a storm water treatment system for which the filtering media can include peat. U.S. Pat. No. 6,287,496 issued to Lownds shows a process for preparing peat granules using a binder and gentle extrusion. In U.S. Pat. No. 5,578,547 issued to Summers, Jr. et al., a mixer machine and process for producing peat beads for adsorption of metal cations at dilute concentrations (<10 ppm) is disclosed. Peat and a sodium silicate or polysulfone/methylene chloride binder are fed to the mixer to form a pellet, followed by drying. This binder chemical acts like a glue to fuse the peat fibers together in order to create a stronger peat pellet. Summers fails to disclose or suggest any thermal activation process step. See also U.S. Pat. No. 5,602,071 issued to Summers, Jr. et al.

Russian Patent No. 2,116,128 issued to Valeriy Ivanovych Ostretsov teaches a process for producing a peat sorbent useful for removing oil spills from solid and water surfaces. The peat material is dried from 60% moisture to 23-25% moisture, and then compressed at 14-15 MPa pressure into briquettes. Next, these peat briquettes are heated at 250-280° C. without the use of additional hydrophobic chemicals and without air. The humic and bitumen fractions within the peat mobilize to the surface of the peat briquettes to produce a natural hydrophobic coating. This hydrophobic coating is necessary for the peat briquettes to be able to soak up oil. Ostretsov also reduces the moisture of his heat-treated peat briquettes all the way down to 2.5-10% wt. moisture. This significant water reduction assists with the hydrophobic coating formation and frees up the pores in the peat material so that they are available to soak up oil. Unfortunately, Ostretsov's aggressive thermal treatment of his peat material will reduce hardness, but he does not need to worry about hardness in his peat briquettes, because he does not force water through the briquettes under pressure during waste water treatment. Instead, he merely floats his peat briquettes on the water surface to soak up the oil spill. Indeed, this is not an ion-exchange medium.

Russian Patent No. 2,173,578 also issued to Ostretsov discloses a similar peat sorbent product useful for soaking up oil spills on water surfaces. His milled peat material with a low degree of decomposition and a moisture level below 60% is dried to 20-48% moisture, and then compressed under pressure at a force below 10 MPa, and then heated under a carbon dioxide blanket without oxygen for 20-90 minutes "at a temperature of 15-30° C. above the exuding temperature of water-insoluble resins of the carrier." However, it is clear that Ostretsov's process will produce a hydrophobic coating on the surface of his peat material, which is the opposite of the hydrophilic surface that is required for adsorption of metal cations from waste water streams.

Peat is a substance that can be pyrolyzed, and comparative studies of the pyrolysis kinetics for coal and peat have been performed. See Durusoy et al., "Pyrolysis Kinetics of Blends of Giediz Lignite with Denizli Peat," *Energy Sources*, vol. 23, pp. 393-99 (2001). But, no particular temperature ranges for pyrolysis were determined in this study, nor was any ion-exchange medium prepared.

Peat as an Ion-Exchange Media

Various efforts have been made to prepare ion-exchange mediums from peat starting material which is chemically activated and, in some cases, chemically modified before the chemical activation step. For instance, U.S. Pat. No. 4,778,602 issued to Allen, III teaches a multi-functional filtering medium consisting of highly humified peat which is treated with an alkaline solution to hydrolyze the humic and fulvic acid fractions contained therein. Next, the peat product is treated with a quaternary amine solution to precipitate out the hunmic and fulvic acid fractions from the peat. After filtering the drying the peat cake, nitric acid or sulfuric acid is added to neutralize the amine to chemically modify the peat to increase its cation exchange sites by either adding $SO_3^-$ groups to the peat surface structure, or to oxidize the organic carbon to improve the cation capacity. Finally, the peat residue may be treated to a semi-coking process step at 200-1000° C. at a 40 psi pressure, thereby allowing carbonization of peat residue. This will actually destroy the carbon fibers. Thus, Allen actually chemically modifies his peat product to increase the cation exchange sites, followed by chemically activating it to increase hydrophobic adsorption properties. The enhanced cation exchange capacity is also aided by destruction of the carbon fibers via the semi-coking (pyrolyzation) step.

U.S. Pat. No. 6,042,743 issued to Clemenson discloses a method for processing peat for use in contaminated water treatment. Clemenson mixes raw peat with heated sulphuric acid to produce sulfonated peat slurry. After cooling and drying the slurry admixture to a 60-70% moisture content, he adds a binder like bentonite clay to coagulate the acidic peat slurry, extrudes pellets, and then bakes the sulfonated peat pellets in an oven at 480-540° C. This baking step drives off the moisture, but it also destroys the carboxylic acid (CHOOH) groups. His chemical activation of the peat material via the sulfonation step adds sulfonate groups ($—SO_3^-$) to the resulting peat granules. In use, Clemenson's peat pellets adsorb metals by attaching the metal cations to the sulfonic groups due to their opposite charged states. Clemenson chemically modifies the surface of peat, but failed to preserve carboxylic groups (COOH) that naturally occur in peat. See also U.S. Pat. No. 6,429,171 issued to Clemenson.

In yet another example, U.S. Pat. No. 5,314,638 issued to Morine discloses a chemically modified peat product that can be used as an ion-exchange material. This peat material is air dried and milled to a size of one mm or less; hydrolyzed in an aqueous hydrochloric acid solution to remove the soluble components (sulfuric acid and nitric acid may also be used); further treated in an extractor with 2-propanol/toluene solvent to remove the solvent-soluble bitumen; dried to remove the residual solvent; and then immersed in a hot concentrated sulfuric acid bath at 100-200° C. for 1-4 hours. This is a chemically-modified peat product. The hot sulfuric acid bath process step comprises chemical modification in which the sulfuric acid reacts with the peat fibers to add sulfonate anions ($SO_3^+$) to its surface. These anions within the ion-exchange resin attract metals to the functional sites in the peat material.

Various efforts have been made within the industry to use granulated and dried peat material as a cation exchange media. More particularly, Soviet Published Patent Application No. 806,615 filed by Peter Illarionovich Belkevich et al. produces a water filter product from pellets comprising a paste made from peat and a precipitate of neutralizing etching solution. This paste and the resulting pellets are produced without any physical activation treatment. Moreover, Belkevich uses his neutralizing etching solution like a glue to hold the peat fibers together in a pellet and therefore obtain the desired granule hardness. Furthermore, Belkevich employs his peat pellets as a filter to remove non-ferrous metals like copper and zinc and petrochemical products from waste water. It is unclear that Belkevich's peat pellets are acting as an ion-exchange material.

Challenges Faced by Peat and Other Natural Organic Materials

But, the large body of available research illustrates the underlying shortcomings for natural peat. In its natural form, peat has low mechanical strength, tends to shrink and swell, and does not allow for hydraulic loading. Moreover, peat and other organic starting materials suffer from a number of other problems that compromise their utility as a sorption medium. For example, prior art activation steps like pyrolysis can cause these materials to lose their ion-exchange capacity. Carbonization may cause considerable shrinkage and weight loss of the materials, as well as loss of natural adsorption properties toward metal ions. Organic sources also generally suffer from non-uniform physical properties. Naturally occurring organic ion exchange media are unstable outside a moderately neutral pH range. Finally, such natural organic ion exchange media tend to be prone to excessive swelling and peptizing, and leaching naturally occurring heavy metals into the treated wastewater solution.

While the processes known in the art for the preparation of sorption material sourced from natural solid organic material like activated carbon have been useful for certain limited adsorption applications, for many other applications it will be necessary to increase the hardness of the ion exchange medium, while minimally sacrificing the media's cation-exchange capacity in the process, and minimize leaching naturally-occurring heavy metals into the treated wastewater solution. It is therefore necessary to develop a low-cost process for producing ion-exchange and adsorption media sourced from natural organic starting material exhibiting good natural ion-exchange capacity, increased adsorption capabilities towards heavy metals, eliminate leaching naturally-occurring inorganic and organic compounds, and improved strength so that the medium can be utilized in a wider range of end-use applications, including the removal of heavy metals from industrial wastewaters. It would also be useful to be able to prepare such a sorption media using low processing temperatures without the use of chemical activation with its caustic and corrosive chemicals, and chemical modification with its reliance upon the addition of functional groups to the media to enhance its ion-exchange capacity. Likewise, it would be beneficial to avoid the aggressive chemical modification of the peat or other organic starting material substrate before the chemical activation step.

Even if a peat or other organic material granule could be produced with appropriate characteristics of hardness and ion-exchange capacity, a percentage of the natural active sites on the media could potentially be filled as a result of the environment of the parent material. In other words, organic materials tend to bond with contaminants in environmental waters. For example, Minnesota peats are often loaded with manganese as a result of the geology and hydrology of their sites. This means that potentially manganese and other metals that naturally exist within, e.g., peat can leach back into the wastewater during the ion-exchange process, thereby leaving the wastewater stream with a new form of unwanted contamination. Therefore, it would be beneficial to produce a process that can chemically treat the granules after any thermal activation step to reduce the levels of manganese and other naturally-occurring metals within the peat that can leach into the wastewater, while increasing the ion-exchange performance and adsorption capabilities by different mechanisms of the granule or pellet for removing heavy metals. U.S. Pat. No. 4,671,802 issued to Jönsson does disclose a chemically-enhanced peat product. The peat material is pretreated with $H_2SO_4$ at pH=3 to protonate the carboxylic acid groups to neutralize the negative charges on the peat surface. A cationic polyelectrolyte of polyamines and polyamide derivatives is then added to bind the peat particles together. Metal salts can be added to reduce the amount of polyelectrolytes required. The peat material is then heated at a high temperature to dry it, and it is then subjected to dewatering in a mechanical press. Thus, this in actuality constitutes a chemical process for eliminating the repulsive forces along the peat surface.

A comparative experiment using peat chemically treated by NaOH or NaCl is disclosed within Corneliu Caramalau et al., "Kinetic Study of Cobalt (II) Adsorption on Peat Activated by Simple Chemical Treatments,": *Environ mental Engineering & Management Journal*, vol. 8, no. 6, pp. 1351-58 (2009). The peat was dried, ground, sized, and then treated with an aqueous 0.2 M solution of $H_2SO_4$, NaCl, or NaOH for 60 minutes. The materials were then used to treat cobalt solutions, and the results compared. The researchers found that there was no real change in the peat particles treated with NaCl solution. The NaOH solution caused carbonyl compounds and undissociated carboxylic acid groups to disappear from the peat surface. It changed the peat surface by hydrolyzation, but it will ruin the strength of the granule, and increase the biological oxygen demand of the cobalt solution. The cobalt adsorption capacity of the chemically-treated peat increased for NaOH (+28.05%) and NaCl (+12.32%), while decreasing for $H_2SO_4$ (−10.79%), the high initial cobalt concentration present in the aqueous solutions diminishes the impressiveness of this 12% value. The researchers found that treatment with NaOH has a greater effect to increase the adsorption capacity of peat, compared to treatment with NaCl, which will discourage researchers from using salt solutions and solutions of acids to increase the adsorption capacity and activity of peat. There is also a lack of information or influence for the proposed treatment on the naturally-occurring heavy metals contaminants in the peat.

SUMMARY OF THE INVENTION

A process for preparation of a granulated or pelletized sorption medium from a partially decomposed organic material like peat, followed by low-temperature thermal activation of the sorption medium to produce a high degree of granule or pellet hardness balanced against an efficacious level of ion-exchange and adsorption capacity, followed by chemical treatment of the sorption material via an acid solution and a salt solution to increase the availability of naturally-occurring active sites in the granules or pellets to enhance their ion-exchange, complexation, chelation, and adsorption performance, while minimizing the leaching of contaminants like metals and organic molecules found in the sorption medium to an aqueous solution is provided by this invention. The sorption medium of this invention can be used in a variety of aqueous solution treatment processes, such as wastewater treatment for removing heavy metal constitutes via ion-exchange and complexation mechanisms, and also reducing the levels of manganese, iron, and other naturally-occurring metals found in the peat substrate from leaching back into the waste water.

In another embodiment of the sorption medium of the present invention, a specially preselected solution of soluble salts may be used for the salt solution used to chemically treat the sorption material, so that when it is used as an ion exchange type medium for treating an aqueous solution like waste waters, the preselected cations from the solution of soluble salts placed on the active sites of the partially decomposed organic material in the sorption medium will alter the coefficient that defines the equilibrium and increase the adsorption capacity more in favor of adsorption of major toxic metals found in the waste water at the expense of less toxic metals found in higher concentrations in the waste water. This allows the end user to target the major toxic metals for adsorption by the sorption medium containing the cations contributed by the preselected solution of soluble salts.

DETAILED DESCRIPTION OF THE PREFERRED EMBODIMENT

Figure 1:
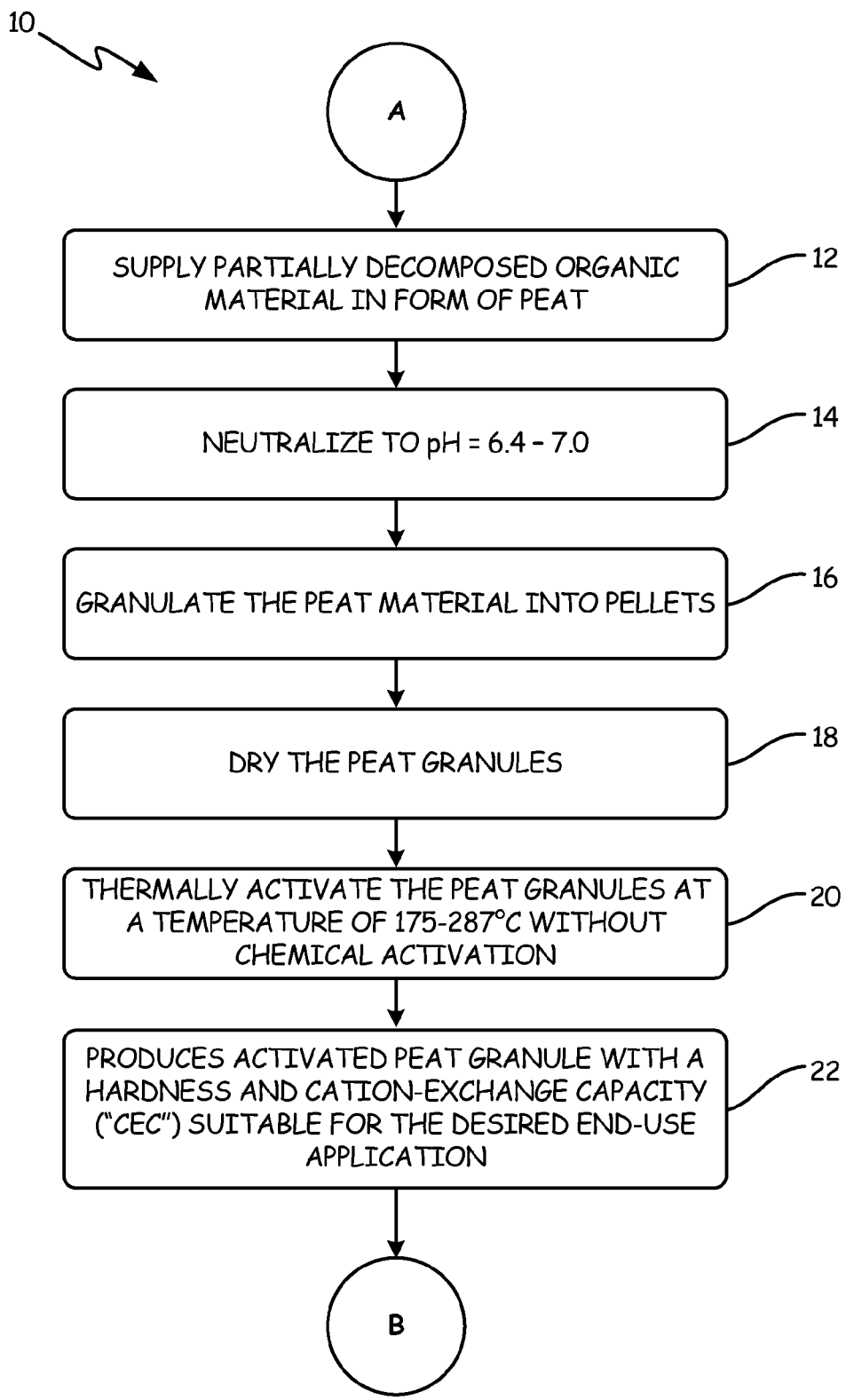
FIG. 1 represents a schematic view of the portion of the process of the present invention for preparing the thermally activated peat granule.

A process for preparation of a granulated or pelletized sorption medium from a partially decomposed organic material like peat, followed by low-temperature thermal activation of the sorption medium to produce a high degree of granule or pellet hardness balanced against an efficacious level of ion-exchange and adsorption capacity, followed by chemical treatment of the sorption material via an acid solution and a salt solution to increase its ion-exchange and adsorption performance while minimizing the transfer of natural impurities found in the sorption medium to an aqueous solution is provided by this invention. The sorption medium of this invention can be used in a variety of aqueous solution treatment processes, such as wastewater treatment for removing heavy metal constituents via ion-exchange and complexation mechanisms, and also reducing the levels of manganese, iron, and other naturally-occurring metals found in the peat substrate from leaching back into the waste water.

In another embodiment of the sorption medium of the present invention, a specially preselected solution of soluble salts may be used for the salt solution used to chemically treat the sorption material, so that when it is used as an ion exchange type of medium for treating an aqueous solution like waste waters, the preselected cations from the solution of soluble salts placed on the active sites of the partially decomposed organic material in the sorption medium will alter the coefficient that defines the equilibrium and increase the adsorption capacity more in favor of adsorption of major toxic metals found in the waste water at the expense of less toxic metals found in higher concentrations in the waste water. This allows the end user to target the major toxic metals for adsorption by the sorption medium containing the cations contributed by the preselected solution of soluble salts.

For purposes of this invention, "partially decomposed organic material" means natural occurring, carbon-based, organic materials that have partially decayed or decomposed over time in the ground, or are plant or animal-based products that are subjected to a bacterial or thermal decomposition process to partially decompose the organic materials therein. Such partially decomposed organic material cover a variety of substances including without limitation compost media (e.g., leaf compost media, peat, plant by-products and combinations thereof), livestock manure, sewage sludge, lignite coal, partially decomposed wood, and combinations thereof. It also covers inorganic materials like apatite (calcium phosphate) and zeolites. Such partially decomposed organic material must also exhibit an ion-exchange capacity between 5-200 mEq per 100 g of organic material, as measured by Barium Acetate Procedure. Compost media is any decayed organic matter. Plant by-products may include partially decomposed plants, leaves, stalks, and silage, for example. Livestock manure is the dung and urine of animals. Sewage sludge is solid, semi-solid, or liquid residue generated by the processes of purification of municipal sewage. Each of the foregoing sources of decomposed or partially decomposed organic matter has innate ion-exchange capacity.

As used in this Application, "aqueous solutions" means any water-based solution containing an environmental impurity as a solute produced by manufacturing, agricultural, or mining industries or population communities. Examples include, without limitation, wastewater discharges; industrial streams; storm water runoffs; mine dewatering streams from mining pits; animal slaughterhouse, cattle-yard, and other agricultural runoffs; spent processing waters emanating from mining, grinding, milling, metallurgical, or extraction process; and hydrofracking.

For purposes of this invention, "impurities," "contaminants," or "aqueous contaminants" means any chemical element or compound found in an aqueous solution that poses a health risk to humans or animals, or is otherwise subject to environmental laws or regulations, including without limitation heavy metals like arsenic, lead, mercury, cadmium, manganese, iron, zinc, nickel, copper, molybdenum, cobalt, nickel, chromium, palladium, stannum, or aluminum; radioactive materials like cesium or various isotopes of uranium; sulfates, phosphorous, selenium, boron, ammonia, refrigerants, and radon gases.

The term "media contaminants" means any chemical element or compound found in the partially decomposed organic material that poses a health risk to humans or animals, or is otherwise subject to environmental laws or regulations. Examples include metals like manganese, iron, calcium, or barium, or organic molecules that can leach from the partially decomposed organic material into treated wastewater.

As used in this Application, "particles" includes any three-dimensionally hardened shaped product formed from the partially decomposed organic material, including, without limitation, granules or pellets.

The term "mEq" means milliequivalents. The equivalent is a common unit of measurement used in chemistry and the biological sciences. It is a measure of a substance's ability to combine with other substances. The equivalent entity corresponding to the transfer of a $H^+$ ion in a neutralization reaction, of an electron in a redox reaction, or to a magnitude of charge number equal to 1 in ions. One Eq of a substance is equal to one more divided by the valence of the substance (i.e., the number of electrons that the substance would engage in participating in the reaction). Because, in practice, the equivalent is often very small, it is frequently described in terms of milliequivalents (mEq). A mEq is $\frac{1}{1000}$ of an equivalent.

The term "hardness" means a property of the granule medium's ability to resist attrition during handling and operation. The "hardness number" is a measure of this property and is determined by way of the "Ball-Pan Hardness" test. The higher the value, the less the losses in uses. A certain amount of material is put into a pan, together with some steel balls, and shaken for a defined period of time. The material is weighed before and after the shaking to determine the amount of attrition. The percent of original material that remains after shaking is the "hardness number."

The terms "empty bed contact time" means the time required for a liquid in a carbon adsorption bed to pass through a carbon column, assuming all liquid passes through at the same velocity. It is equal to the volume of the empty bed divided by the flow rate.

The term "sorption" means a variety of chemical mechanisms for removing a chemical element or chemical compound from an aqueous solution, including cation-exchange, complexation, chelation, adsorption, or absorption.

The term "about" means approximately or nearly, and in the context of a numerical value or range set forth herein means=2% of the numerical value or range recited or claimed.

The term "µg" means microgram or one-millionth of a gram or one thousandth of a milligram.

The term "ng" means nanograms or $1 \times 10^9$ grams or 0.000000001 grams.

As used within this Application, "major toxic metals" means any chemical element or compound found in an aqueous solution that poses a health risk to humans or animals, or is otherwise subject to environmental laws or regulations, including without limitation heavy metals like arsenic, lead, mercury, cadmium, manganese, iron, zinc, nickel, copper, molybdenum, cobalt, nickel, chromium, palladium, stannum, or aluminum; radioactive materials like cesium or various isotopes of uranium; sulfates, phosphorous, selenium, boron, ammonia, refrigerants, and radon gases.

For purposes of this application, "more innocuous metals" means any chemical element or compound found in an aqueous solution that does not necessarily pose a health risk to humans or animals or is otherwise subject to environmental laws or regulations, including without limitation metals like magnesium, beryllium, strontium, barium, calcium, manganese, copper, zinc, iron, lead, potassium, lithium, as well as ammonium and ammonium groups.

While the sorption medium of the present Application is described using peat as the partially decomposed organic matter starting material, it should be understood that the invention is not limited to peat-based sorption material. Likewise, the end-use applications for the sorption media of the present invention extend well beyond the treatment of heavy metals in wastewater streams described in this Application. For example, the sorption media of the present invention can also be used to remove sulfates, phosphates, and radio-nucleotides from aqueous solutions. They can also serve as solid-phase extraction tools, as well as a chemical useful in the mining industry for concentrating copper.

Production Process for Thermally-Activated Sorption Material

The process for preparing the sorption medium product 10 of the present invention is depicted in FIG. 1 where peat is used as the starting partially decomposed organic material 12. A variety of different types of peat may be used for purposes of this invention, including without limitation, reed sedge, sphagnum peat, high moor peat, transitional moor, and low moor peat. The peat material should be dug from the ground and used in its natural state without any further decomposition process steps. It may, however, be cleaned to remove sticks, stones, and other foreign debris from the fibrous peat material.

Next, the peat material 12 is adjusted for acidity to a pH range of about 6.4-7.0. Finely ground calcium carbonate may be admixed into the peat material for this purpose. Such calcium carbonate should preferably have a particle size of about minus 325 mesh. It should be admixed on a weight ratio basis of about 1-5%, preferably 2%, with the peat material 12.

The substantially neutralized peat material 14 is then introduced to a granulating machine 16, such as one sourced from Andritz, Inc. of Bellingham, Wash. The loose, substantially neutralized fibrous peat material 14 will be tossed around inside the drum of the granulator to cause the fibers to adhere to each other, and build up granules of desired size. A binder additive like lignosulfonate may be optionally added to the peat material in the granulator drum to assist this granulation process.

Alternatively, the loose, substantially neutralized peat material 14 may be introduced to an extruder. This extruder will apply pressure to the fibrous material to produce pellets of desired size. Such an extruder may be sourced from J.C. Steele & Sons of Statesville, N.C.

Next, the peat granules or pellets 16 are sent to a dryer 18 such as a belt or rotary dryer sourced from Harris Group of Atlanta, Ga. Using direct heat, the peat granules or pellets will travel through the length of the dryer having an inlet temperature of about 400° C. and an outlet temperature of about 80° C., so that the natural 40% wt moisture level of the peat material contained in the peat granules or pellets will be reduced to about 10-14% wt moisture. Thus, this drying step 18 should be carried out across a temperature range of about 80-400° C. with the preferred temperature of exposure being about 90° C. for about 45 minutes.

The resulting dried peat granules or pellets are then crushed and screened to an appropriate size of about 6 mesh×30 mesh to 30×100 mesh.

The dried peat granules or pellets 18 are then introduced to a thermal activation step 20, also known as "torrefaction." The peat granule or pellet is put in a jacketed ribbon mixer that has thermal fluid like oil circulating through the jacket. The ribbons are fitted with "lifters," which pick up the granular peat and drop it through the atmosphere inside the ribbon mixer. This exposure to the hot, inert atmosphere is critical to bringing the granule up to temperature as quickly as possible.

During this heating process, a unique combination of time and temperature are critical for the production of the thermally-activated peat granule (called "APTsorb II" within this Application). Activation (IUPAC Recommendations 1996) can be defined as input of external energy into a chemical system to bring about activation of the system. This activation will initiate or expedite thermochemical reactions. In the instance of this APTsorb II peat granule, heat as a form of energy is first provided by the thermal fluid circulating in the ribbon mixer. This heating process results in the chemical reaction-decomposition of hemicellulose, which occurs naturally in partially decomposed plant matter such as peat. The decomposition of hemicellulose is itself exothermic, as evidenced by a continuing rise in atmospheric temperature even when the heat input of the thermal fluid is stopped. As it decomposes and gives off heat, hemicellulose is converted to highly reactive, cyclic molecules called lactones. Some of these lactones escape the reaction zone along with moisture, but given the correct starting temperature and duration, the bulk of the lactones remain within the reaction zone and undergo a cross-linking polymerization with the natural matrix of the peat. This cross-linking reaction is the result of the exothermic reaction of thermal decomposition of hemicelluloses. It also is the reaction which results in the hardened peat granule called APTsorb II.

The term activation itself has several different meanings and nuances. Activation as described by activated carbon, a common filtration media for purification of liquids and gases, is described as pyrolysis and carbonization of organic material, which is resulted in the increase of surface area and can be tightly controlled by reagents and temperature to create a material with very specific porosities and physical absorption activity/capacity. It can be achieved by thermal or chemical/thermal reactions.

Thus, the temperature of the thermal fluid is quickly raised to approximately 300-320° C., more preferably 304° C., to thermally activate the peat granules to increase their hardness. The temperature inside the mixer slowly rises as volatiles and contained moisture are driven off. This gasified water and volatile mix constitute the "inert" atmosphere and work to purge air out of the ribbon mixer.

As the temperature in the atmosphere inside the mixer climbs into the 216° C. range, the rapid breakdown of hemicellulose begins. This is the same reaction as torrefaction of wood. This breakdown of hemicellulose is an exothermic chemical reaction which allows for a rapid rise in the temperature of the atmosphere inside the mixer. The actual temperature of the granule is hard to determine but probably is much lower.

The above reaction is allowed to continue as the temperature is driven into the 271-277° C. temperature range. At this point, the boiler that is used to heat the thermal fluid is turned off. The above reaction releases enough heat to maintain the temperature of the atmosphere in the above range. The process is allowed to continue until approximately 20 minutes have passed where the temperature has been maintained above 271° C.

In the case of the APTsorb II peat granule, the media is described as partially activated. This refers to the thermal energy that is delivered to the peat material to initiate the decomposition of hemicellulose in the tightly controlled manner that leads to the increase of structural hardness of the material without losing the natural ability of material to sorb metal ions. If the reaction were allowed to continue past the prescribed time, the resulting material would continue to gain structural hardness but would lose its ability for sorption of metals.

This thermal activation process step 20 should preferably be conducted at a temperature inside the activator of about 175-287° C., preferably 200-275° C., more preferably 250° C., and a time period of about 25-90 minutes, preferably 30-60 minutes, for achieving maximum granule hardness. In order to achieve maximum cation exchange capacity in the peat granule, the activation step should be conducted for 25-90 minutes, preferably 25-40 minutes. It has been found that 32 minutes represents an optimal compromise as an activation step time duration for achieving desirable levels of both granule hardness and cation exchange capacity. Note that this activation temperature range is different from the higher 300-320° C. oil temperature used to heat the activator. The thermal heat is applied directly to the dried peat granules 18 without any steam, carbon dioxide, nitrogen, or other inert gas media typically used within the industry in a physical activation process.

In an alternative embodiment, a thermal carrier like steam, carbon dioxide, nitrogen, or other inert gas media can be used in the thermal activation step 20 to deliver the heat as a form of energy to the peat granule. The gas should preferably be carbon dioxide, and the peat granule should be exposed to it for a time period of about 20-90 minutes, preferably 40-60 minutes. Unlike the physical activation process known in the prior art, this inert gas is not used to oxidize the surface of the peat granule. Instead, it is merely employed as a carrier gas to improve the application of the heat to the peat granule pursuant to the thermal activation step.

Regardless of which method is used to thermally activate the peat granules or pellets, the heating process is stopped at this point, and water is injected in order to rapidly cool the product and stop the reaction. Target moisture for the finished product should be at least 10% so as to prevent the thermally activated peat granules from becoming too hydrophobic. Danger of fire developing within the bagged product is greater if finished product is less than 5% moisture content.

This thermal activation results in a hardened media that maintains its structural integrity even when wet and retains its affinity for metals. The physical appearance of the APTsorb II peat granule is not substantially different from its starting non-thermally-activated material (called "bio-APT").

The degree of granule hardness for the resulting thermally-activated peat granule 22 of the present invention should have a Ball-Pan Hardness number of about 75-100%. More preferably, this Ball-Pan Hardness number should be about 80-98%. Depending upon the specific end-use application for the peat granule 22, a person skilled in the art will be able to determine the necessary hardness value falling within this range.

The peat granules thermally activated in the manner described in this Application will exhibit a copper cation-exchange capacity ("Copper CEC") of about 120 mEq/100 g of $Cu^{2+}$ at a thermal activation temperature of about 232° C., while a 287° C. temperature condition produces a partially activated peat granule with a cation-exchange capacity of about 92 mEq/100 g of $Cu^{2+}$. Untreated peat has a natural copper cation-exchange capacity of about 120 mEq/100 g of $Cu^{2+}$. Thus, cation-exchange capacity suffers at relatively higher thermal activation temperatures within the 232-287° C. range, and granule hardness is improved at activation times up to 60 minutes, while degrading after 90 minutes and at temperatures above 287° C. Thus, this invention provides a tradeoff between granule hardness and cation-exchange capacity.

There is significant shrinkage in the actual size of the individual thermally-activated peat granules, so they are screened again across a 30 mesh screen. Losses due to shrinkage under the process of the present invention are typically 15%.

Without wanting to be bound to any particular chemical theory, it is believed that this thermal activation step comprises torrefaction of the peat granule, which necessarily requires lower temperatures like the preferred 200-275° C. range identified above. According to a glossary of terms used in chemical kinetics, including reaction dynamics (IUPAC Recommendations 1996), activation can be defined as the input of external energy into a chemical system to bring about activation of the system. As commonly understood within the industry, "torrefaction" is a medium-temperature, thermochemical process, commonly carried out around 250-300° C., which significantly improves the grindability of wood and straw. Peat naturally has carbohydrates in it, which undergo a thermochemical decomposition to produce lactones, which are then broken down into hydroxy acids that react with natural polymers found within the peat material to cross-link, and as a result to harden the peat granule. At the same time, this relatively low-temperature range for the thermal activation step will preserve enough of the natural ion exchange capacity of the peat material to preserve the efficacy of the resulting ion exchange medium. This combination of increased peat granule hardness and preserved ion exchange capacity renders the peat product of the present invention an ideal, natural ion exchange medium for removing heavy metal cations from waste water. Thermal activation is normally applied in the industry to activated carbon material to increase its surface area.

Note that this 200-275° C. thermal activation temperature range of the present invention is considerably lower than the temperatures normally associated with conventional physical activation and chemical activation. In the case of physical activation, the starting material for, e.g., activated carbon, will first be carbonized by pyrolyzing it at a high temperature generally within the range of 600-900° C. in an inert, oxygen-depleted atmosphere using gases like argon or nitrogen, followed by an activation step in which the carbonized material is exposed to an oxidizing atmosphere provided by, e.g., carbon dioxide, oxygen, or steam at a high temperature usually within the range of 600-1200° C. The carbonization step produces a large number of micropores within the surface of the carbonaceous starting material. The physical activation step is used to drive off chemical compounds which might clog these pores. Thus, the very high temperatures of physical activation are used to increase the hydrophobic adsorption capacity of the starting material. But these high temperatures will also tend to soften the carbonized and activated carbon particles, and destroy the cation-exchange properties.

As for the case of chemical activation, when some of the energy required for a reaction is provided by a preceding exothermic chemical reaction, there is said to be "chemical activation." For chemical activation, pyrolysis char, carbonized product, or carbonaceous material would be impregnated with some chemical reagents, such as phosphoric acid, zinc chloride, alkaline hydroxides, and ferric chloride. Under conventional chemical activation, the material can be then carbonized at a lower temperature (e.g., 450-900° C.), which is still significantly high compared against the 200-275° C. partial activation temperature range of this invention. This heat treatment will destroy the cation-exchange sites of the material.

As for the case of chemical modification, the carbonaceous material will be treated with, e.g., sulfuric acid to increase its cation-exchange sites by adding $SO_3^-$ groups to the surface structure to improve the cation-exchange capacity. But once again the chemical modification process is employed to increase the cation-exchange capacity while decreasing the hardness of the carbonaceous material without preserving the natural cation-exchange properties of the peat material. By materially softening the peat granules or pellets, it therefore will become necessary to reform the granules or pellets with the assistance of a binder additive after the activation step.

Indeed, the process of the present invention does not employ chemical activation, nor chemical modification. Instead, the process of the present invention seeks to partially activate the peat granules to an incomplete degree using relatively low temperatures for a relatively limited time period, without addition of chemical groups via chemical modification in order to increase granule hardness while maintaining or at least minimizing the decrease in cation-exchange capacity of the heat-activated peat material.

Chemical Treatment Process for the Thermally-Activated Sorption Material

Figure 2:
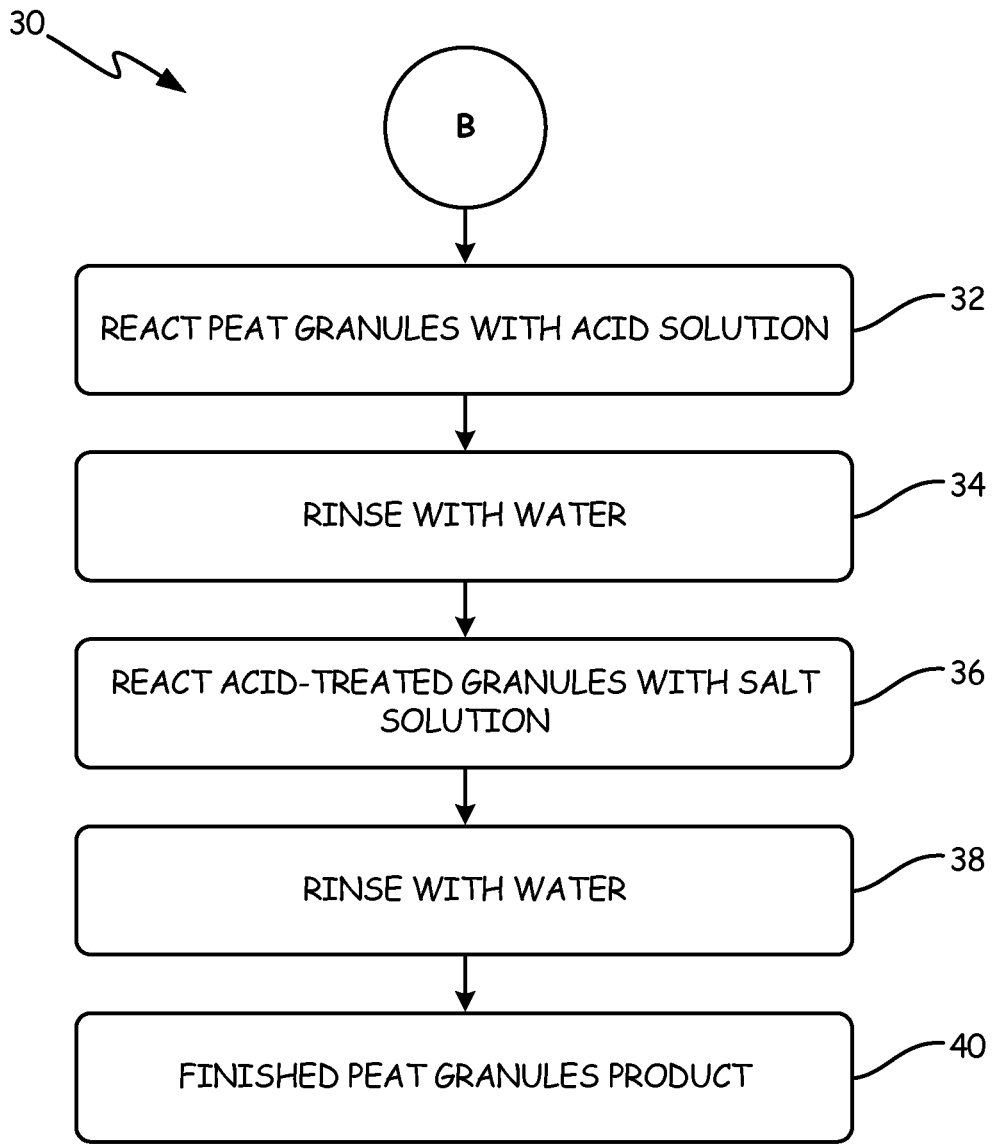
FIG. 2 represents a schematic view of the portion of the process of the present invention for chemically treating the thermally activated peat granule by means of an acid solution followed by a salt solution to reduce the presence of unwanted minerals within the peat complex, while increasing the sorption capacity and activity of peat granules.

In an important aspect of the process of the present invention, the thermally activated peat granules 22 having desired degrees of hardness and cation-exchange capacity characteristics are treated to a chemical treatment process 30 after the thermal activation step 20, as shown in FIG. 2. First, the peat granules are immersed in an acid solution like a 1 molar (lesser or greater) solution of hydrochloric acid, formic acid, acetic acid, sulfuric acid, nitric acid, or phosphoric acid. The resulting chemical reactions for this acid solution treatment step 32 can be carried out at room temperature, but proceed much faster (and more cost effectively) at elevated temperatures. Favorable results are obtained at temperatures as high as 100° C. (210° F.). At the upper end of this temperature range, reaction time can be shortened from 24 hours to 10 minutes. The acid solution will dissolve the mineral forms of calcium, manganese, iron, and possibly other metals.

This acid solution treatment step seeks to remediate one of the intrinsic flaws of natural peat. Peat material has been formed by nature in a metal-enhanced environment. The ground and surface waters that feed wetland systems are generally rich in minerals and metals. In particular, the waters of northern Minnesota, because of the geology of the region, have raised concentrations of manganese. Manganese is a benign metal abundant in the glacial till that was uniformly deposited across the upper Midwest during the last glacial events. Manganese has a complicated chemistry and readily morphs between dissolved and mineral forms depending on the chemical matrix of the water.

As peat forms, manganese is accumulated in two ways. First, the dissolved form of the metal is adsorbed onto the active sites of the organic surface and held there by chemical bonds. Second, dissolved manganese precipitates inside the peat matrix and results in the accretion of interstitial minerals. Both types of accumulation result in increased manganese concentrations of the natural peat.

Following the acid solution reaction step 32, the acid-treated peat granules are rinsed with water in either a batch process or continuous process to remove metal ions from pore spaces and surfaces of the peat granule until the test for the presence of calcium ions is negative. This rinse step 34 can also be conducted at room temperature, but is more cost-effectively done at temperatures as high as 93° C. (200° F.), the manganese, calcium, and other cations, as well as residual acid from the peat granule surface. This rinsing step is repeated one more time, preferably six more times, or until the test for presence of calcium and/or chloride ion is negative.

Following this rinse step, metal ions (comprising mostly calcium, manganese and iron ions) need to be removed from the complexation and ion exchange sites (where they are weakly held) on the internal and external surfaces of the peat granule. This is accomplished by immersing the peat granule in a 1 molar (lesser or greater) solution of sodium chloride or other salt solution of $Na^+$, $Li^+$, $K^+$, or $Cs^+$. Again, these chemical reactions for this salt solution treatment step 36 can be carried out at room temperature, but proceed much faster (and more cost-effectively) at temperatures as high as 100° C. (210° F.). At the upper end of this temperature range, reaction time can be shortened from 24 hours to 90 minutes. The salt solution will displace the metal ions from the complexation and ion exchange sites in much the same way as sodium or magnesium ions are used to displace metal ions in the regeneration of standard ion exchange resins.

Following this salt solution treatment step, the peat granules 36 are rinsed in water to remove the residual salt solution and any remaining metal ions from the internal and external surfaces of the peat granule. This rinse step 38 should be continued until the concentration of chloride ions is down to an acceptable level. Again, this can be done at room temperature, but proceeds at a much faster rate at a temperature of 100° C. (210° F.).

The finished peat granule sorbent medium 40 following the chemical treatment process 30 will exhibit approximately the same granule hardness as for the thermally-activated granule of step 20. Thus, this chemical treatment process does not diminish the important peat granule harness properties achieved through thermal activation.

The final thermally-activated, chemically-treated peat product will typically have a granular size distribution as shown below in Table 1 with about 95% of the granules falling within the 16-50 mesh size range.

TABLE 1

| Stays on | APTsorb III batch # 05.12.11 |
|---|---|
| 10 mesh | 0% |
| 16 mesh | 21.0% |
| 20 mesh | 34.0% |
| 30 mesh | 24.7% |
| 50 mesh | 14.8% |
| Bottom pan | 5.0% |

The Ball-Pan Hardness value for the thermally-activated, chemically-treated peat granules will be about 75-90%, preferably 80-90%. Such granules will exhibit stability without losing their ability to adsorb metals in an aqueous environment at pH=1-8.

Sorption activity is measured in different ways for the thermally-activated, chemically-treated peat granule product. Unlike the copper CEC method used for the thermally-activated, non-chemically-treated intermediary product 22, the capacity and activity for the finished thermally-activated, chemically-treated product 40 is measured through a 24-hour equilibrium with a 30,000 ppb cadmium solution in a 1:100 (w/v) ratio. Following the equilibrium and filtering, the peat granule filtrate is analyzed for cadmium concentration, as a measure of adsorption activity generally, using cadmium as proxy. A higher concentration translates into a granule with less CEC and activity. Granules chemically treated in the manner described under this invention will typically have equilibrium filtrates between 50 and 200 ppb cadmium, while increasing the active sites on the peat granule surface and capacity of those granules for heavy metal cation affinity, while also minimizing the biological oxygen demand in the treated waste water. These last three characteristics are produced by the acid solution reaction step 32 and salt solution reaction step 36. The acid solution treatment step 32 and salt solution treatment step 36 displace $Ca^{+2}$ and $Mn^{+2}$ ions that are occupying complexation and ion exchange sites on the internal and external surfaces of the peat granules. This results in a net increase in CEC, increased in-site activity, and reduced leaching of organic molecules, as well as heavy metal contaminants, such as manganese, iron, etc.

Cadmium adsorption capacity represents another methodology for measuring sorption activity of the thermally-activated, chemically-treated peat granules. If the granules are placed in an aqueous water solution having a 50 ppb cadmium concentration, over time an equilibrium between cadmium ions moving between the granules and aqueous solution will be reached. There will be about 10-20 mEq Cd/100 g peat material at this 50 ppb Cd concentration in the aqueous solution, preferably 15-18 mEq Cd/100 g peat material. This measures the ability of the peat granules to adsorb cadmium at low equilibrium concentration in the solution.

Just as importantly, by reducing the presence of manganese cations naturally found in the peat granules, less manganese can leach into the waste water stream during treatment with the thermally-activated, chemically-treated peat granules 40 of the present invention. Granules prepared as described herein will leach less than 5 ppb manganese, preferably less than 1 ppb manganese, into water when acting as an ion-exchange medium in a column contactor. Manganese is a contaminant whose presence should be controlled in potable water. Hence, the sorbent medium 40 retains much of its inherent cation-exchange capacity, obtains an increased capacity for metals in solution, and has increased strength and durability when exposed to water, and less leaching of organic molecules. These characteristics make the media well-suited for waste water remediation, and other treatments of aqueous and non-aqueous solutions to remove contaminants and impurities.

Finally, another characteristic of the thermally-activated, chemically-treated peat granule product of the present invention is its maximum measured loading capacity for cadmium ions. This value is 35-50 mEq/110 g at almost unlimited $Cd^{+2}$ concentration dosing, preferably 40-45 mEq/100 g.

The following examples illustrate the process of the present invention for producing the sorbent medium 40 from partially decomposed organic matter using low-temperature thermal activation and the acid solution and salt solution chemical treatment steps. This sorption medium is called "APTsorb III."

EXAMPLE 1

Determining the Proper Activation Temperature Range for the Thermally-Activated Peat Granules Base Process Exemplary multifunctional granular media was prepared. Each granular medium included peat. The peat selected was of a reed sedge type commercially available from American Peat Technology, LLC of Aitkin, Minn.

For each of the Examples 1A, 1B, 1C, and 1D, the peat material was first dried to a moisture content of about 40%. Using a granulating machine, this material was then compressed and dried again to a moisture level of about 6%. The resultant material was then crushed and sized to a range of about 10-30 mesh.

Observations with respect to activation temperatures, product yield, cation-exchange capacity, Ball-Pan Hardness number, and Iodine numbers were made as noted in each example, and in Table 2.

EXAMPLE 1A

A process for the production of a multifunctional granular medium by means of partial activation of peat was used. The peat was partially activated at 232° C. for about 30 minutes. The granular material achieved a maximum temperature of 212° C. with an outlet steam temperature in the reactor of 132° C., Two pounds of steam was used per pound of product produced. The yield of the product produced was 90% of the weight of the granular material input.

The product from Example 1A had a cation-exchange capacity of 120 mEq/100 g of $Cu^{2+}$. The Ball-Pan Hardness number was 88.6%. The surface area was 198 mg/g as determined by the Iodine number.

EXAMPLE 1B

A process for the production of a multifunctional granular medium by means of partial activation of peat was used. The peat was partially activated in an inert environment at 287° C. for about 30 minutes.

The granular material achieved a maximum temperature of 260° C. with an outlet steam temperature in the reactor of 162° C. Two pounds of steam was used per pound of product produced. The yield of the product produced was 90% of the weight of the granular material input.

The product from Example 1B had a cation-exchange capacity of 92 mEq/100 g of $Cu^{2+}$. The Ball-Pan Hardness number was 96.9%. The surface area was 123 mg/g as determined by the Iodine number.

EXAMPLE 1C

A process for the production of a multifunctional granular medium by means of partial activation of peat was used. The peat was partially activated at 343° C. for about 30 minutes. The granular material achieved a maximum temperature of 326° C. with an outlet steam temperature in the reactor of 182° C. Two pounds of steam was used per pound of product produced. The yield of the product produced was 80% of the weight of the granular material input.

The product from Example 1C had a cation-exchange capacity of 68 r Eq/100 g of $Cu^{2+}$. The Ball-Pan Hardness number was 97.3%. The surface area was 178 mg/g as determined by the Iodine number.

EXAMPLE 1D

A process for the production of a multifunctional granular medium by means of partial activation of peat was used. The peat was partially activated in an inert environment at 4827° C. for about 30 minutes. The granular material achieved a maximum temperature of 454° C. with an outlet steam temperature in the reactor of 273° C. Two pounds of steam was used per pound of product produced. The yield of the product produced was 65% of the weight of the granular material input.

The product from Example 1D had a cation-exchange capacity of 13 mEq/100 g of $Cu^{2+}$. The Ball-Pan Hardness number was 76.4%. The surface area was 304 mg/g as determined by the Iodine number.

medium such as that seen in Example 1D with an Iodine number of 304 mg/g is better suited for use as an organic adsorption medium. At the same time, this tradeoff between increased granule hardness and decreased cation-exchange capacity also explains why the process of the present invention only partially activates the peat material, instead of the complete activation of the carbonaceous starting material that is typical practiced in the industry. By this partial activation process using an activation temperature range of 175-287° C., preferably 200-275° C., the inventors seek to increase granule hardness while maintaining or at least minimizing the decrease in the cation-exchange capacity of the heat-activated peat material. The degree of granule hardness and cation-exchange capacity required for a particular end-use application will be obvious to a person of ordinary skill in the art who is equipped with the process parameters of this invention.

The data reveal that thermal activation at temperatures at the lower end of the range produces a granular medium with a higher product yield and higher cation-exchange capacity than thermal activation at higher temperatures within the range. It was observed that the Ball-Pan Hardness number

TABLE 2

| Example | Activation Temp (° C.) | Maximum Granule Temp (° C.) | Outlet Temp (° C.) | Product Yield (wt. %) | Cation-Exchange Capacity (mEq/100 g) | Ball-Pan Hardness (%) | Iodine Number (mg/g) |
|---|---|---|---|---|---|---|---|
| 1A | 232 | 212 | 132 | 90 | 120 | 88.6 | 198 |
| 1B | 287 | 260 | 162 | 90 | 92 | 96.9 | 123 |
| 1C | 343 | 326 | 182 | 80 | 68 | 97.3 | 178 |
| 1D | 482 | 454 | 273 | 65 | 13 | 76.4 | 304 |

It was observed for Examples 1A-1D that the cation-exchange capacity and Ball-Pan Hardness numbers were within ranges satisfactory for use in ion-exchange applications. The thermal activation step is conducted at a lower temperature and time frame, compared with prior art chemical activation and physical activation processes known within the industry, that results in partial activation of the sites on the peat surface. In these particular examples, the peat material was partially activated for thirty minutes, which is very short when compared against prior art activation processes. One will notice that the 232° C. temperature condition in Example 1A produced a partially activated peat product with a Ball-Pan Hardness value of 88.6% and a cation-exchange capacity of 120 mEq/100 g of $Cu^{2+}$, while the 287° C. temperature condition used in Example 1B produced a partially activated peat product with a Ball-Pan Hardness value of 90.0% and a cation-exchange capacity of 92 mEq/100 g of $Cu^{2+}$. Untreated peat has a natural cation-exchange capacity of 120 mEq/100 g of $Cu^{2+}$ (page 4, lines 29-31). This shows that as the activation temperature for the peat material is increased, the granule hardness increases, while the cation-exchange capacity decreases. But at the 343° C. activation temperature of Example 1C, the granule hardness creeps up slightly to 97.3%, while the cation-exchange capacity crashes to 68 mEq/100 g of $Cu^{2+}$. Meanwhile, the 482° C. activation temperature of Example 1D causes the granule hardness to decrease to 76.4%, while the cation-exchange capacity plunges to a completely unacceptable 13 mEq/100 g of $Cu^{2+}$ and the Iodine number is significantly higher. A higher Iodine number generally indicates a greater adsorptive capacity for organic chemicals. Therefore, though the ion-exchange capacity is somewhat compromised at the higher temperature of activation, a hits its peak at the level of thermal activation expressed in Examples 1B and 1C. After that level of thermal activation is reached, the internal bonds in the peat granule begin to break down, causing an observed decrease in the hardness number. It was also observed that thermal activation at points along the range produces a granular medium with a Ball-Pan Hardness number that is within satisfactory ranges for use as an ion-exchange material.

EXAMPLE 2

Process for Producing Thermally-Activated

"APTsorb II" Peat Granules

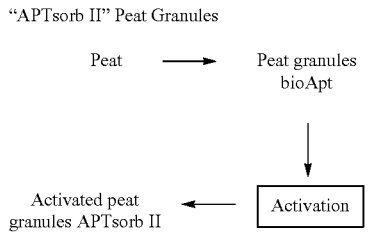

The APTsorb II peat granule media was prepared using peat of a reed-sedge type commercially available from American Peat Technology, LLC of Aitkin, Minn., The raw peat material was first dried to a moisture content of about 40% wt. The dried, raw peat was extruded into pellets, dried again to reduce the moisture content to about 12% wt, and finally crumbled and sieved. This process resulted in a multifunctional granular media called "bioAPT."

The finished bioAPT peat granule with a size range of 10×30 mesh was then thermally activated to produce the APTsorb II media. The bioAPT granules were introduced into a jacketed ribbon mixer. The mixer had thermal fluid circulating through the jacket at a temperature of about 300° C., thereby effectively heating the atmosphere inside the mixer. Additionally, the mixer ribbons were fitted with "lifters" that picked up the media and dropped it through the heated atmosphere. Also, the design of the mixer and the resulting chemical reactions resulted in an oxygen-free atmosphere inside the mixer. The bioAPT material was heated and mixed within this oxygen-free atmosphere for approximately 32 minutes, at which point the chemical reactions necessary for thermal activation were complete, and the granular media was converted into the APTsorb II media. This media was then quickly cooled, using a water spray, and the moisture content was adjusted to about 10% wt moisture level.

Four production trials of the APTsorb II peat granules were recorded and tested for quality control purposes. Observations with respect to activation temperatures, product yield, copper cation exchange capacity, and ball-pan hardness were made as shown in Table 3.

A=weight of sample loaded onto hardness pan prior to the abrasion step (g).

Generally, a higher Ball-Pan Hardness number generally indicates a harder granule that is more resistant to abrasion. A lower Ball-Pan Hardness number generally indicates that more media is abraded by the steel balls and is less durable.

The method used to measure the cation-exchange capacity ("CEC") of the thermally-activated APTsorb II peat granules was a modification of the usual CEC methodology, and represents a concession to the need for speed in the industrial research lab. The exchange of cations on the surface of the media is measured using the media as produced, without first converting the surface to an $H^+$ form, and the indication of exchange is measured by the concentration of the exchanging ion before and after contact with the media. The exchanging ion in this case is copper, prepared as a 1000 ppm solution of copper using copper chloride, buffered to a pH of about 4.8. The buffer solution was prepared by adding 1.68 ml of glacial acetic acid and 9.51 g of sodium acetate trihydrate to Type I deionized water and diluting to 1 L. The buffer solution was then used to make the 1000 ppm copper solution by dissolving 2.683 g of $CuCl_2*2H_2O$ in the 1 L of buffer solution.

TABLE 3

| Sample | Activation Temp (° C.) | Activation Time (min) | Outlet Temp (° C.) | Product Yield (wt. %) | Copper Cation-Exchange Capacity (mEq/100 g) | Ball-Pan Hardness (%) |
| --- | --- | --- | --- | --- | --- | --- |
| Reed-Sedge Peat | | | | | 132 | 5 |
| BioAPT | | | | | 148 | 85.7 |
| APTsorb II Run 1 | 302 | 32 | 200 | 83 | 134 | 96 |
| APTsorb II Run 2 | 315 | 32 | 204 | 85 | 135 | 97 |
| APTsorb II Run 3 | 304 | 34 | 203 | 83 | 140 | 95 |
| APTsorb II Run 4] | 302 | 40 | 201 | 81 | 125 | 97 |

A modified ASTM D3802-10 standard test method was used for purposes of measuring Ball-Pan Hardness of the thermally-activated APTsorb II peat granules. The moisture content of the media was measured using a Mettler Toledo MJ33 moisture meter. Water was then added to 200 g media in order to bring the moisture content to 35% wt. The media was mixed thoroughly and kept for 15 min at room temperature. At the end of the equilibrium period, the media was free-flowing and not sticky, indicating that the correct moisture content had been reached. One hundred thirty grams of the moistened media was screened on a 50 mesh sieve shaker for 3 minutes. A 100 g sub-sample (A in the formula) of media after screening (usual particle size are 10-50 mesh) was placed in the sieve catch pan, and 36 steel balls (15.9 mm diameter, 16.3 g each) were added. The catch pan was covered, and the sub-sample was shaken for 6 minutes to approximate abrasion and attrition. Following this abrasion step, the steel balls were removed, and the media was screened again on a 50 mesh sieve for 5 minutes. The amount of media retained on the 50 mesh screen was recorded in grams (B in the formula).

The Bali-Pan Hardness number was calculated using the following equation:

$$H=B/A\times100$$

where:

H=Ball-Pan Hardness number

B=weight of sample retained on hardness test sieve after the abrasion step (g)

The media was dried on a Mettler Toledo MJ33 moisture meter at 160 degrees ° C. until its weight was stable for 30 seconds. One gram of the dried media was then added to 100 ml of the 1000 ppm copper solution, and the mixture was stirred at around 300 RPM for 3 hrs at room temperature. The flask and stirring rod were positioned so that the rod made contact against the wall of the flask, thereby effectively pulverizing the media over the course of the stirring period. The mixture was filtered and the concentration of $Cu^{2+}$ was measured by colorimetry or by graphite furnace atomic absorption spectroscopy. The cation exchange capacity of the media was calculated using following formula:

$$CEC,mEq/100\ g=(I-F)*20/63.5$$

where:

I=initial concentration of copper in the solution (ppm).

F=final concentration of copper in the solution (ppm).

The results shown in Table 2 demonstrate the repeatability and consistency of the thermal activation method for producing the APTsorb II granule under this invention.

EXAMPLE 3

Chemical Treatments of the Thermally-Activated APTsorb II Peat Granules to Produce the APTsorb III Peat Granule This invention describes a process for improving the performance of the thermally-activated APTsorb II peat granule to minimize the leaching of manganese and organics into waste water streams treated by the resulting APTsorb II granular peat material. The process used to produce this APTsorb III material is illustrated as follows:

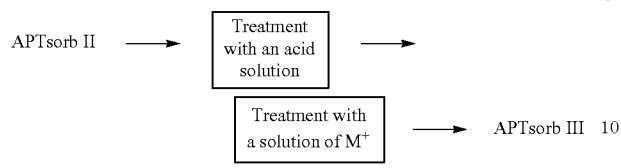

A 2 L volume of a 1N solution of HCl was added to 1 kg of the APTsorb II media at room temperature. The mixture was kept at room temperature for 24 hrs with periodic shaking in such a fashion so as not to destroy the granules. The pH was maintained at a value of 2 or lower. This acid treatment was completed when the concentration of calcium, manganese and other bivalent ions reached maximum concentrations in the solution as determined by the titration procedure described below. The mixture was filtered and washed six times with water or until the test for the presence of chloride ions in the filtrate, as described below, was negative. The volume of combined acid and rinsing solutions was 11 L.

Following the acid treatment, 5 L of 1 M solution of NaCl was added to the media, and the mixture was refluxed for 90 minutes. Following the reflux period, the mixture was filtered while it was still hot and washed with water until the test for the presence of chloride ions in the filtrate was negative. The volume of combined salt and rinsing solutions was 8 L.

The solid part was dried at 105° C. for 24 hrs to yield 760 g of thermally-activated and chemically-treated granular peat media called APTsorb III. Samples of the APTsorb III material were subjected to the quality control (QC) test as described below. The material balance for the chemical treatment steps is shown in Table 4.

TABLE 4

Example of material balance for APTsorb III production.

| Reagents | Amount |
| --- | --- |
| APTsorb II (11.2% H$_2$O) | 1000 g |
| 1N HCl | 2 L |
| Rinsing with H$_2$O | 11 L |
| 1M NaCl | 5 L |
| Rinsing with H$_2$O | 8 L |
| APTsorb III (QC = 160 ppb) product | 760 g |

The removal of the organics and chloride ions by the aqueous solution at 180° F. (82° C.) accounts for the reduction of mass for the APTsorb III peat granules.

The tests referred to above are critical for the production of the APTsorb III peat granules. If the bivalent ion concentration in the acid solution does not reach maximum while the solution pH remains below 2, it indicates that the mineral fraction that naturally occurs in the parent peat material is incompletely removed. The incomplete removal of this mineral fraction results in the leaching of manganese and calcium later when the product is utilized as a filtration media. Also, the acid treatment results in the exchange of metals for hydrogen ions on the active surfaces of the peat material, thereby "cleaning" the impurities inherent in the parent peat material.

The following titration procedure was used to measure the concentration of calcium, manganese, and other bivalent ions contained in the HCl solution that were removed from the APTsorb II material: An ammonium buffer was prepared by adding 20 g of ammonium chloride and 74 ml of ammonium hydroxide (28-30% NH$_3$) to a flask and diluting it to 1 liter with Type 1 deionized water. The pH of the buffer was 10.02. Ten milliliters of the HCl acid treatment filtrate was added to an Erlenmeyer flask and diluted with 50 ml of Type I deionized water. The pH1 was adjusted to slightly acidic (pH=4-6) if necessary by the addition of a 5% solution of NH$_4$OH in deionized water or 1N HCl. An excess of 0.1N solution of EDTA in water was added, swirled, and kept at room temperature for 20 minutes to allow for complete complexation between the EDTA and bivalent ions present in the acid treatment filtrate. Three milliliters of a 4% solution of triethanolamine in type I deionized water was added and swirled. Ten milliliters of the ammonium buffer solution was added so that the pH of the solution was 10. Immediately, 5-10 drops of an indicator solution of eriochrome black T was added, and the mixture was titrated with a 0.1N solution of MgCl$_2$ in deionized water until the color changed from blue to pink\red.

The concentration of bivalent ions in the sample was calculated as follows:

$$C_{Sample} = \frac{(C_{EDTA} \times V_{EDTA}) - (C_{MgCl2} \times V_{MgCl2})}{V_{Sample}}$$

The following test was used to detect the presence of chloride ions in the rinsing water: Five tenths milliliter of a 1% solution of silver nitrate was added to a 20 ml sample of rinsing water. If chlorides were present, a white precipitate in the form of silver chloride formed immediately, which evidenced the need for additional rinsing.

The following cadmium equilibrium quality control test ("QC test") method was used to measure the adsorption activity of peat granules. One gram of dried media was added to 100 ml of a 30 ppm solution of Cd$^{2+}$ in Type I deionized water. The equilibrium was rolled at 8 rpm at room temperature (20±2° C.) in a leak-proof vessel for 24 h. The mixture was filtered using 0.45 µm polypropylene syringe filter membrane. The liquid fraction was preserved by adding concentrated HNO$_3$ and analyzed by GFAA spectroscopy for the concentration of Cd$^{2+}$ and Mn$^{2+}$ ions. This procedure measures the activity of the media: a lower concentration of Cd$^{2+}$ in the solution translates into more of the cadmium being adsorbed onto the media and thereby indicates greater activity.

EXAMPLE 4

Measurement of Naturally Occurring Heavy Metals in Peat Materials

The concentrations of manganese and cadmium contained in raw peat samples were determined. The samples came from the reed-sedge deposit used by American Peat Technology to produce its granular products, and a sample collected north of Detroit Lakes, Minn. Additionally, APTsorb II peat granules were analyzed as a comparison.

The samples were dried for 24 hrs at 105° C. and cooled in a desiccator. A crucible was pre-fired by heating to 550° C. for 2 h in a muffle furnace. After the crucible was cooled, 0.250 g of dry sample added to the crucible and the sample was carbonized at 150° C. for 30 min. The temperature was then increased to 550° C. and ashed for 4 h. The color of ash was grayish-white. The residue was digested by adding 10 ml of concentrated $HNO_3$ and heating it to 95° C.±5° C. using a ribbed watch glass as a cover. The heat was monitored to result in a gentle reflux for 10 to 15 min. The reaction mixture was cooled, and a 5 ml of concentrated $HNO_3$ was added, the cover was replaced, and the reaction mixture refluxed for 30 additional minutes. Care was taken to maintain a covering of solution over the bottom of the vessel at all times. If brown fumes were generated, indicating oxidation of the sample by $HNO_3$, the second addition step was repeated until no brown fumes were given off by the sample, thereby indicating the complete reaction with $HNO_3$. The reaction mixture was cooled and diluted to 100 ml with deionized water. The solids were filtered on Whatman No. 542 filter paper, and the filtrate was analyzed by graphite furnace atomic adsorption spectrophotometer. The results for manganese and cadmium are shown in Table 5.

TABLE 5

| Media | $C_{Mn}$ (mg/g) | $C_{Cd}$ (mg/g) |
|---|---|---|
| Raw peat from Aitkin, MN (reed-sedge) | 0.217 | 0.00025 |
| APTsorb II | 0.413 | 0.00036 |
| Raw peat from Detroit Lakes, MN (reed-sedge peat) | 0.231 | 0.00036 |

As can be seen in Table 4, both the raw peat samples contain approximately the same concentration of manganese, indicating peat across Northern Minnesota was exposed to ground water laden with manganese over the years. As expected, the APTsorb II peat granules contain approximately twice the concentration of manganese, reflecting the densification of the product as it is produced. At the same time, the peat granules contain less peat material than the starting raw peat material due to the yields under the production process being less than 100%. Thus, the same amount of manganese distributed over the smaller peat mass in the denominator causes the concentration of manganese in the APTsorb II granules to be higher in Table 5.

EXAMPLE 5

Leaching of Manganese into Water

The presence of manganese contained in the natural peat source material results in the leaching of manganese from the APTsorb II granules into aqueous solutions, including treated water streams or aqueous solutions. The bulk of this leaching stems from the mineral form of the metal which was precipitated inside the peat matrix as it was being formed.

Equilibrium tests were conducted for the three samples from Table 5. A 10 g of media was added to 100 ml of deionized Type I water and rolled at 8 rpm for 48 hours at room temperature. The mixture was filtered and the filtrate was preserved with nitric acid. The concentration of manganese in the water was analyzed by graphite furnace atomic adsorption spectrophotometer (GFAAS). The results are shown in Table 6 below.

TABLE 6

| Media:Water = 1:10, 48 hrs | |
|---|---|
| Media | $C_{Mn}$ (ppb) |
| Raw peat from Aitkin, MN (reed-sedge peat) | 450 |
| APTsorb II granules | 150 |
| Raw peat from Detroit Lakes, MN (reed-sedge peat) | 445 |

The raw peats from Aitkin, Minn. and Detroit Lakes, Minn. show similar leaching propensities, indicating similarity in geology. The mineral fraction of the manganese accumulation accounts for the bulk of the leaching, because manganese that is chemically adsorbed onto the peat surface is not readily released by water.

The APTsorb II peat granules showed less leaching into the water solution than the raw peat media samples, thereby reflecting a certain amount of fixing of the natural manganese during the thermal activation step. Nonetheless, the APTsorb II granules still exhibited enough leaching of manganese into the water solution to cause a concern, especially given that it is a filtration media for heavy metals.

EXAMPLE 6

The Effect of the Treatment of Thermally-Activated Peat Granules (APTsorb II) with Acid Alone APTsorb II media was treated with a solution of HCl in deionized water, as well as successive treatments with HCl, $HNO_3$, and $H_2SO_4$ acid solutions. In each case, 500 g of APTsorb II material was added to 1 L of a 1N acid solution. In the case of the three successive acids treatment, the material was treated with the acids in series, not simultaneously, with rinsing steps between each acid treatment. Following the acid treatments, the samples were subjected to the cadmium equilibrium QC test, and the manganese leaching tests described above. Additionally, the manganese leaching test was modified to include an aqueous solution with a pH of 2. The filtrates were preserved with concentrated $HNO_3$ and then analyzed for manganese and cadmium concentrations by graphite furnace atomic adsorption spectrometry. The results are shown in Table 7.

TABLE 7

| | | Peat Media | | |
|---|---|---|---|---|
| Solution | Metal | APTsorb II (untreated control) | HCl-treated APTsorb II | HCl, $HNO_3$, $H_2SO_4$ acid-treated APTsorb II |
| DI water | $C_{Mn}$, ppb | 328 | 75 | 2 |
| DI water pH = 2 | $C_{Mn}$, ppb | 2475 | 1170 | 159 |
| 30,000 ppb $Cd^{2+}$ solution | $C_{Mn}$, ppb | 420 | 121 | 20 |
| | $C_{Cd}$, ppb | 1400 | 2300 | 4400 |

The acidified water solution caused a much higher level of manganese leaching from all three media compared against the plain deionized water solution. This is further supported by increasingly reduced levels of manganese leaching, across all solutions, as acid treatment becomes more aggressive. The three-acid treated sample yielded extremely low levels of manganese leaching in deionized water, thereby demonstrating the efficacy of the acid treatment step of the present invention.

Although the matter of manganese leaching is largely addressed by aggressive acid treatment, it gives rise to another limitation: the ability of the media to adsorb cadmium is restricted. This cadmium adsorption activity is decreased as acid treatments become more aggressive. The result reported in Table 6 in the $C_{Cd}$, ppb row represents a measurement of how much cadmium was left in the aqueous 30,000 ppb cadmium-laden solution after contact with the peat media. The untreated APTsorb II granules left 1400 ppb cadmium in solution, while the three-acid-treated APTsorb II granules left 4400 ppb cadmium in solution, indicating more cadmium removal activity by the untreated APTsorb II control media. Moreover, the cadmium equilibrium QC test of three-acid treated media yielded a higher level of manganese concentration over the DI water equilibrium, suggesting that manganese ions may remain on the active sites and can be replaced by other competing ions when they are present. This indication lends itself to the need for an additional treatment step to further free the active sites in the peat granules of natural manganese—the salt treatment step of the present invention.

EXAMPLE 7

The Effect of the Treatment of Thermally-Activated Peat Granules (APTsorb II) with Salt Alone Acid treatment of the APTsorb II peat granules has been demonstrated to remove the bulk of the natural manganese, but has deleterious effects on the adsorption capacity of the media. This further suggests that acid treatment alone does not clear the active sites of manganese. Because the active sites are exchange sites, the common practice of regeneration—where an ion-exchange media is renewed by replacing the toxic, sorbed ion with an innocuous ion such as sodium or magnesium—is a likely solution for displacing the manganese and reducing the leaching issue while at the same time retaining the sorption capacity.

One hundred grams of APTsorb II peat granules was added to 500 ml of a 1 M solution of NaCl. One mixture was heated to 80° C. for 90 min with periodic shaking in such a fashion so as not to destroy the granules. A second mixture was kept at room temperature for 24 h, and again periodically shaken so as to not destroy the granules. Following the reaction time, the media was filtered (while it was still hot, in the case of the 80° C. sample) and washed with water until the test for the presence of chloride ions in the filtrate was negative. Adsorption activity of the samples by the cadmium equilibrium test (QC test) was measured as described above. The filtrates were analyzed for manganese and cadmium by graphite furnace atomic absorption spectrometry. The results are shown in Table 8 below.

TABLE 8

Effect of treatment of APTsorb II with a solution of NaCl in water

| Treatment solution | 1 M NaCl in H2O | |
|---|---|---|
| T (° C.) | 25 | 80 |
| Treatment time, hrs | 24 | 1.5 |
| Concentration of Cd and Mn in the NaCl solution after treatment | | |
| $C_{Cd}$, ppb | 8 | 13 |
| $C_{Mn}$, ppb | 8,000 | 14,100 |
| Cd equilibrium test using a 30,000 ppb solution (QC test). | | |
| $C_{Cd}$, ppb | 750 | 380 |
| $C_{Mn}$, ppb | 84 | 56 |

The concentration of cadmium remaining in solution after the cadmium equilibrium QC test was 750 ppb at 25° C. and 380 ppb at 80° C., indicating that the adsorption activity of the salt-treated APTsorb II granules increased as the treatment temperature increased from 25° C. to 80° C. Additionally, the concentration of manganese in the treatment solution also increased from 8,000 ppb to 14,100 ppb, suggesting that the salt treatment is more effective when heated. However, the cadmium equilibrium QC test revealed that manganese is still leaching from the media, reaching the concentration of 84 ppb and 56 ppb after treatment at 25° C. and 80° C., respectively. The presence of manganese in the solution after the QC test indicates that not all manganese ions were removed during the salt treatment and suggests that the treatment of APTsorb II granules with salt solution is not enough to remove the bulk of the natural manganese and, consequently, make the active sites available for adsorption. This result suggests that a combination of acid and salt treatment, in series, may be necessary to achieve the goal.

EXAMPLE 8

The Effect of the Treatment of Thermally-Activated Peat Granules (APTsorb II) With Acid Solution Followed By Salt Solution The supporting data from Examples 6 and 7 suggested a the benefits of a two-part chemical treatment process for producing APTsorb III peat granules. The results suggest that the use of a single acid followed by a salt treatment with heat may reduce the leaching of manganese while retaining the activity and capacity for adsorption and lead to the process for production of the APTsorb III material.

The APTsorb III peat granules were produced by mixing 500 g of APTsorb II material and 1 L of 1 N HCl. The mixture was kept at room temperature for 24 h with periodic shaking as to not destroy the granules. After the acid treatment, the media was rinsed with deionized water until the filtrate was free of chlorides as described in the test above. The media was then mixed with 5 L of 1 M NaCl solution and heated. The mixture was held at 90-100° C. for 90 minutes, filtered while still hot, and rinsed until free of chlorides as described above. The treated media was then dried for 24 h at 105° C.

The adsorption activity of the APTsorb III material was measured by the cadmium equilibrium QC test. Filtrates were preserved and analyzed for manganese and cadmium, using graphite furnace atomic absorption spectrometry. The results are shown in Table 9 below.

TABLE 9

Concentration of Mn and Cd after QC test with initial concentration of Cd equal 30,000 ppb.

| | Raw reed-sedge peat | APTsorb II | APTsorb III 1 kg scale | APTsorb III 500 lb scale |
|---|---|---|---|---|
| $C_{Cd}$, ppb | 1200 | 1400 | 160 | 50 |
| $C_{Mn}$, ppb | 200 | 420 | 0.9 | 1 |

As can be seen, the acid and salt treatments together essentially eliminated the leaching of manganese. At the same time, the cadmium adsorption of acid/salt-treated media indicates much higher activity compared with the parent peat material and the APTsorb II material.

The first step, an acid treatment step, effectively removed the greater part of the mineral form of manganese and other contaminants, and likely also displaced some of the ions that are filling ion-exchange sites with hydrogen. The second step, a salt treatment step, regenerated the other active sites besides ion-exchange on the media to a sodium form. Sodium, which is a single-valet cation, is not the preferred ion for those sites, but the equilibrium of the process is driven by high concentration and heat to the sodium-form state. Therefore, when the media is subjected to a target metal, competing ions with a valence of +2 readily displace the sodium ions, which makes the media more active towards sorption of metals compared with the parent material.

The result of this mechanism is illustrated in Table 8, where the concentration of manganese leaching into the solution is reduced from 420 ppb for the APTsorb II material to 1 ppb for the APTsorb III product. Simultaneously, the activity of the APTsorb III product is enhanced over the APTsorb II material, and even the parent peat material. The APTsorb III product left between 50 and 160 ppb cadmium in solution, versus 1200 and 1400 ppb for raw peat and the APTsorb II material, respectively. Thus, the APTsorb III product of the present invention amply demonstrates the value of both the acid solution treatment and the salt solution treatment in series.

EXAMPLE 9

Activity of APTsorb III Peat Granules for Adsorption of Heavy Metals

Figure 3:
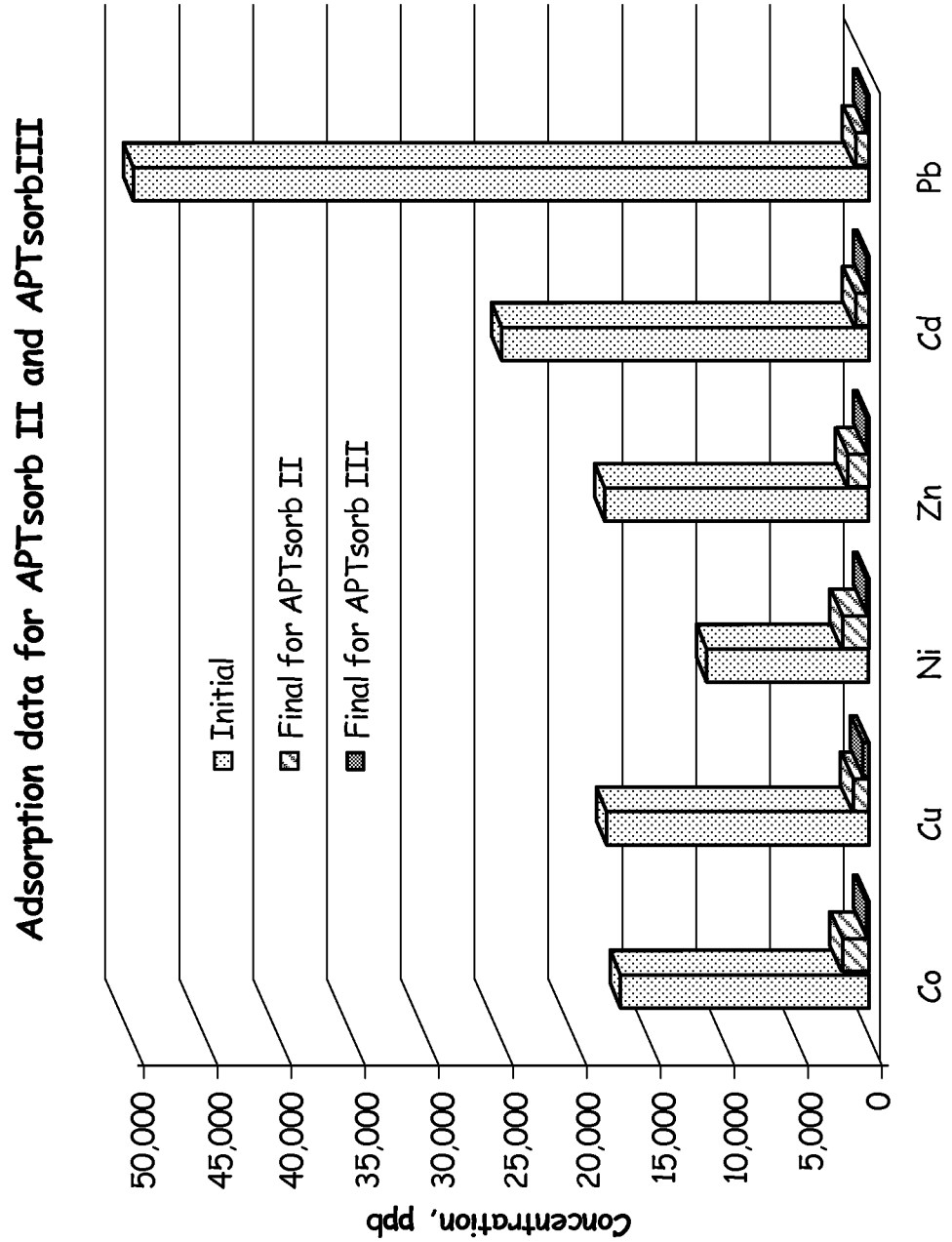
FIG. 3 represents a graphical depiction of comparative adsorption data for the non-chemically treated, thermally-activated peat granules (APTsorb II) and its chemically-treated counterpart material (APTsorb III).

The equilibrium test was performed using APTsorb II material and the APTsorb III product with other metal ions in order to determine their respective affinities for heavy metals other than cadmium, and to compare the performance gains of the APTsorb III product over the APTsorb II material. The typical test procedure uses 1 g of APTsorb peat granules dried at 105° C. for 24 hrs, which was added to 100 ml of a solution of metal ion in Type I deionized water. The mixture was tumbled in an end-over-end fashion at 8-28 rpm at room temperature (20±2° C.) in a leak-proof vessel for 24 hrs. The mixture was filtered using 0.45 μm polypropylene filter membrane, and the filtrate was preserved by adding of a solution of $HNO_3$. The initial and final concentrations of metal ions were measured by graphite furnace atomic adsorption spectrophotometry. The results are shown in Table 10 and FIG. 3.

TABLE 10

Comparison of adsorption activity of APTsorb II and APTsorb III granular peat products.

| Metal ions | $Co^{2+}$ | $Cu^{2+}$ | $Ni^{2+}$ | $Zn^{2+}$ | $Cd^{2+}$ | $Pb^{2+}$ |
|---|---|---|---|---|---|---|
| $C_{initial}$, ppb | 29000 | 22000 | 23000 | 32000 | 30000 | 51,000 |
| APTsorb II peat granules | | | | | | |
| $C_{final}$, ppb | 2100 | 1300 | 1900 | 1400 | 960 | 980 |
| Percent of removal (%) | 87.65 | 87.65 | 92.78 | 82.73 | 92.22 | 96.16 |
| APTsorb III peat granules | | | | | | |
| $C_{final}$, ppb | 360 | 500 | 420 | 300 | 50 | 380 |
| Percent of removal (%) | 98.76 | 97.73 | 98.17 | 99.06 | 99.83 | 99.25 |

In all cases, the adsorption activity of the APTsorb III peat product was dramatically improved after chemical treatments of the APTsorb II material. These results demonstrate that the chemical treatment of peat media of the present invention increases the activity of the surface chemistry of the peat granules, resulting in a more active adsorption media for heavy metal adsorption.

EXAMPLE 10

Figure 4:
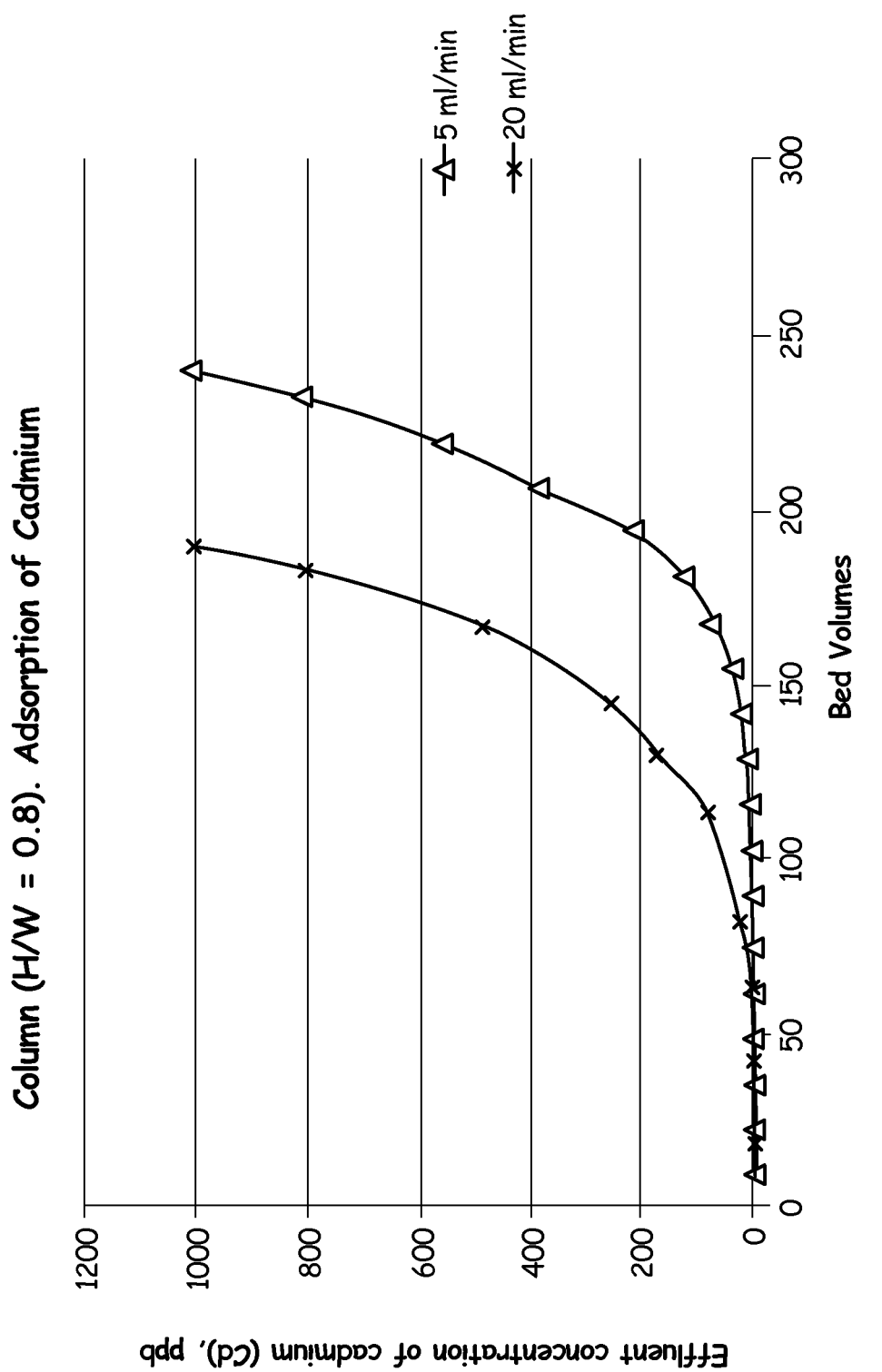
FIG. 4 represents a graphical depiction of the effluent concentration of cadmium at different flow rates in a bed.
Figure 5:
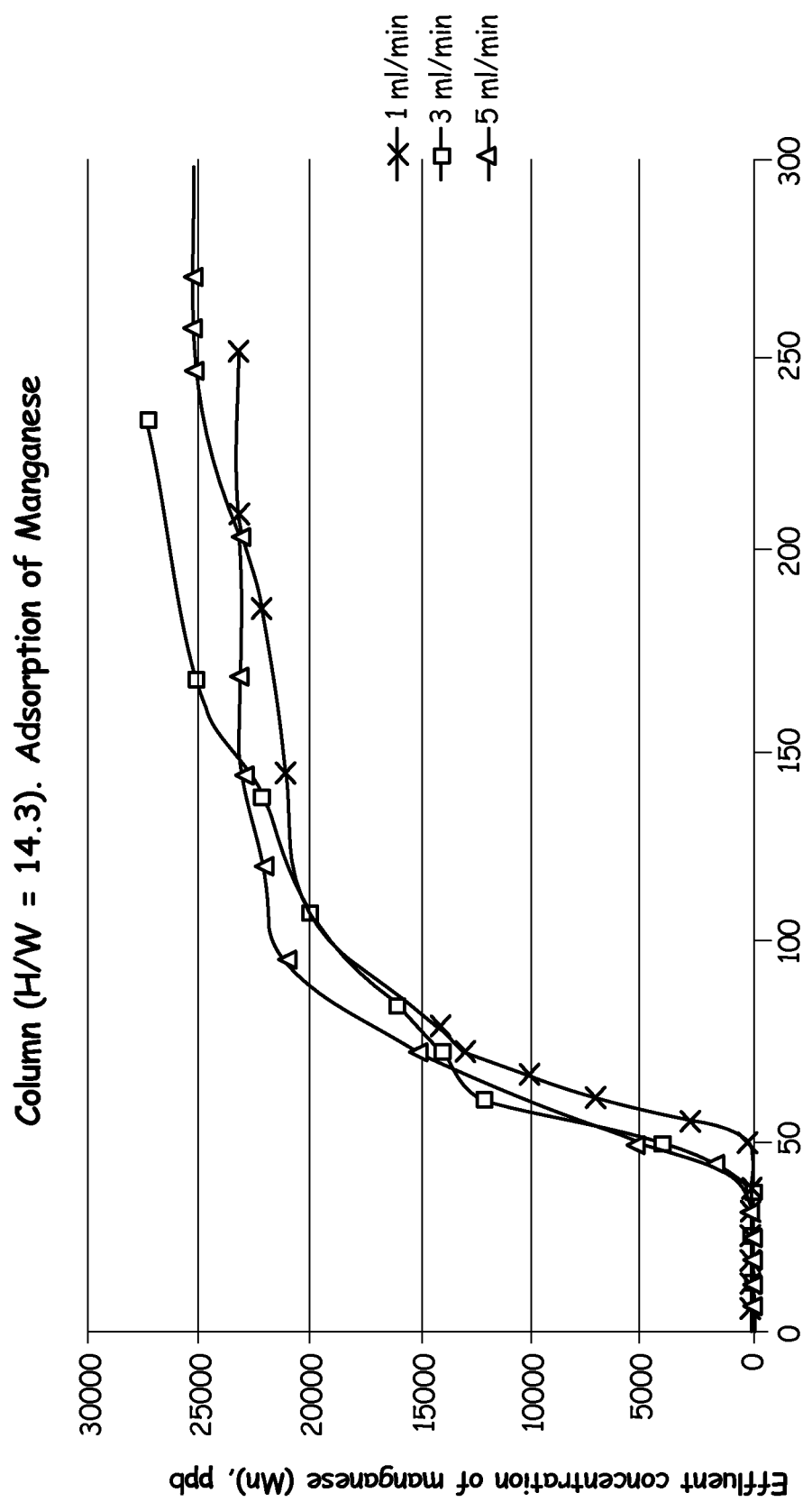
FIG. 5 represents a graphical depiction of the effluent concentration of manganese at different flow rates in a bed.

The Activity of the APTsorb II Product Toward Adsorption of Mn and Cd Using a Column The kinetic performance of the APTsorb III peat product was determined by bench-scale columns using varying flow rates (flow velocity). The APTsorb III peat granules were pre-wetted in Type I deionized water for a minimum of 3 hours. The column was loaded from the top, first with a plastic screen to retain the media inside the column, then a layer of HCl-washed Red Flint filter gravel (granular size 3-5 mm), and then with pre-wetted APTsorb III. A second plastic screen was placed on top of the APTsorb III granules, and finally a second layer of filter gravel was spread on the top of the screen. The influent flow was controlled by a peristaltic pump, and all flows were bottom feed to produce an upward flow. A minimum of 10 bed volumes of Type I deionized water were pumped through the column prior to the testing solution. A solution of 30 mg/L cadmium or manganese in water was then introduced into the column. The solutions were at room temperature, and the pH was not adjusted, Effluent samples were periodically collected, preserved with $HNO_3$, and analyzed by graphite furnace atomic absorption spectroscopy. The results are reported as shown in FIGS. 4 and 5 and Table 11.

TABLE 11

Column adsorption data for Mn and Cd.

| $C_{influent}$ | Flow rate | $m_{granules}$ | Column diameter | Bed depth | Aspect ratio of bed | Flow rate | Flow velocity | Breakthrough capacity at 50 ppb | |
|---|---|---|---|---|---|---|---|---|---|
| ppm | ml/min | g | cm | cm | (Height:Width) | BV/hr | m/hr | mg/g | mmol/100 g |
| Adsorption of $Cd^{2+}$ | | | | | | | | | |
| 30 | 5 | 72.3 | 6.2 | 5 | 0.81 | 1.99 | 0.10 | 10.15 | 8.90 |
| 29 | 20 | 72.3 | 6.2 | 5 | 0.81 | 7.95 | 0.40 | 5.75 | 5.05 |
| Adsorption of $Mn^{2+}$ | | | | | | | | | |
| 30 | 1 | 20 | 1.5 | 21.5 | 14.33 | 0.57 | 0.34 | 2.39 | 4.64 |
| 30 | 3 | 20 | 1.5 | 21.5 | 14.33 | 1.70 | 1.02 | 1.77 | 3.21 |
| 30 | 5 | 20 | 1.5 | 21.5 | 14.33 | 2.83 | 1.70 | 1.54 | 2.80 |

The sorption capacity of the APTsorb III peat granule product is dependent upon a flow velocity of influent. As can be seen from the results of Table 10, the capacity of the peat granule for holding cadmium is twice the value (8.90 mmol/100 g) at 0.10 m/hr than what it is (5.05 mmol/100 g) at the higher 0.40 m/hr flow velocity. The capacity of the APTsorb III granule is less for manganese, because the peat material has a smaller affinity for $Mn^{+2}$ cations than $Cd^{+2}$ cations. Time is a critical component for metal cations to chemically attach themselves to the active sites on the surface of the peat granule. Thus, smaller lower flow velocities for the column may be beneficial.

EXAMPLE 11

A $Ba(OAc)_2$, cation-exchange test may be performed as follows:

A 2.00 g sample of air-dried sorbent was placed in a 300-mL flask, 100-mL of 0.5 N hydrochloric acid (HCl, analytical grade), was added and the flask was shaken in a mechanical shaker for 2 hours. The reaction mixture was filtrated through filter paper and the solid was washed with 100-mL measures of distilled-deionized water until a 10-mL sample of the wash showed no precipitate with 3 mL of 1% silver nitrate (AgNO3). The moist sorbent was then transferred to a clean 300-mL flask and shaken in a mechanical shaker for 1 hour with 100 mL, of 0.5 N barium acetate $(Ba(OAc)2)$ solution. The solution was then filtered and washed with three 100-mL portions of deionized water. The sorbent was then discarded and the washings were titrated with 0.5 N sodium hydroxide, using 5 drops of phenopthaline as an indicator. The CEC was calculated as follows: meq/100 g air-dried sorbent=(V NaOH mL×normality NaOH×100)/weight of sorbent (g).

In aqueous solutions containing high concentrations of cadmium, the thermally-activated and chemically-treated sorption medium discussed above will treat the aqueous solution in accordance with Reaction I shown below:

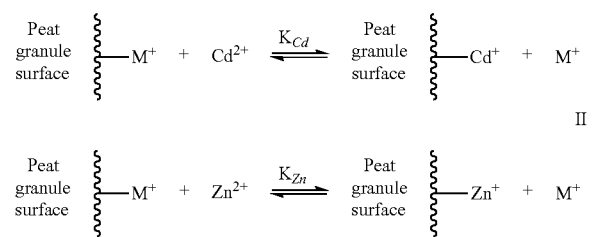

The metal cations $M^+$ located on the peat granule active sites, which are described above as being $Na^+$ resulting from the sodium chloride salt solution used to chemically treat the sorption medium, will be displaced by the cadmium ($Cd^{2+}$) cations found in the aqueous solution during the ion exchange treatment process with the result that the cadmium cations are adsorbed by the peat granules with the benign $Na^+$ cations dispersed in the treated aqueous solution. The adsorption capacity of the sodium cation-loaded peat granule sorption medium for the cadmium contaminants in the aqueous solution is described in Example 12 below:

EXAMPLE 12

Determining the Adsorption Capacity for Cadmium by the Sodium Cation-Loaded Sorption Medium General Experimental Column Procedure The experimental set-up for the column system consisted of a plastic column resulting in a bed size of 62 mm in diameter and 50 mm deep as shown. 72.3 g of APTsorb III sorption medium loaded with sodium cations on its active sites prepared in accordance with Example 3, and having a particle size distribution of between 10-50 mesh, was submerged in type I deionized water (18.2 MOhm) for 10 hrs, to wet the surface of the granules and allow the granules to swell. Plastic mesh was installed at both the top and the bottom of the column. The column was packed with 20 mm of HCl-washed Red Flint filter gravel (granular size 3-5 mm)[1] and then with 50 mm of pre-wetted APTsorb III. Five bed volumes of type I deionized water were pumped through the column prior to the testing solution. A solution of 30 mg/L cadmium in water was then pumped from a holding tank to the bottom of the column (up-flow, fixed-bed). The liquid flow rate was controlled by a peristaltic pump. All experiments were performed at 25° C. and at an initial pH of 5.7. In order to ensure the formation of a complete breakthrough curve, water samples were collected using a Foxy 200 fraction collector. In the event that air started to accumulate in the column, the air was either forced out by tapping the column walls or the top of the column was removed.

[1] Red Flint Rock and Stone, 717 Short Street, Eau Claire, Wis. 54701, phone: 800.238.9139.

Each water sample was preserved by addition of a solution of $HNO_3$ (TraceMetal Grade) in water and analyzed for the concentration of $Cd^{2+}$ using a graphite furnace atomic absorption spectroscopy technique and $Zn^{2+}$ using flame ionization atomic absorption spectroscopy technique. Breakthrough behavior was evaluated by plotting the cadmium and zinc solution concentrations in the effluent as a function of the total number of bed volumes that had been treated. The amount of metal ion adsorbed in the column was determined from the area above the breakthrough curve assuming the breakthrough happens when the concentration of the metal in the effluent reaches 50 ppb. The absorption capacity of modified APTsorb III granules was verified by digesting the spent granules and measuring the concentration of the metal ions.

Specific Column Procedure for Cadmium Adsorption Determination

Figure 6:
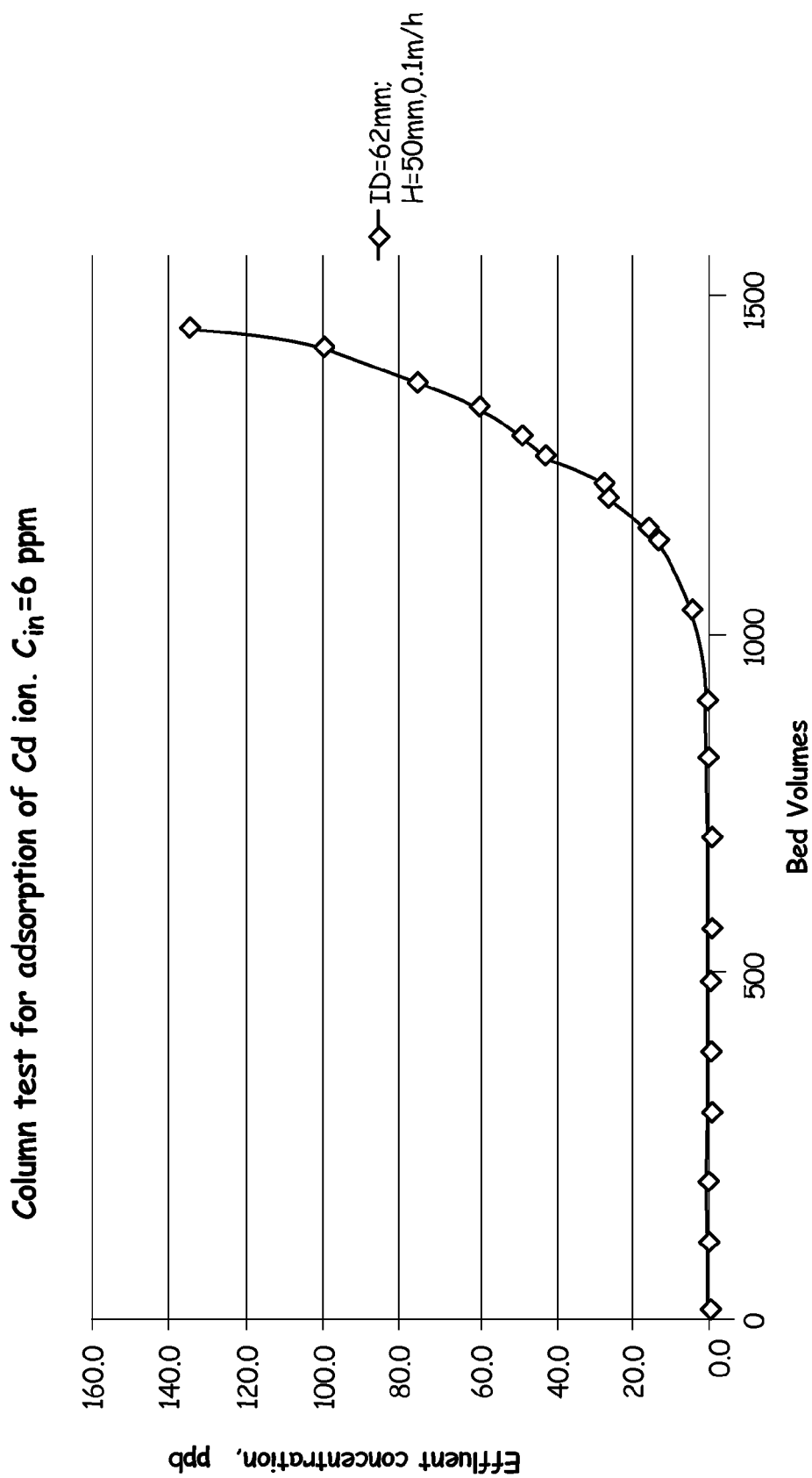
FIG. 6 represents a graphical depiction of the cadmium adsorption from an effluent aqueous solution stream containing only cadmium cations using a sodium-loaded sorption medium of the present invention.

Using the General Column Procedure described above, a synthetic solution of cadmium with concentration 6 ppm was prepared by dissolving cadmium chloride in Type I deionized water (18.2 MOhm). Na-APTsorb II peat granules were loaded into the column having a column diameter of 6.2 cm, a bed depth of 5 cm, and a bed volume of 150.95 cm$^3$. Employing a flow rate for the cadmium aqueous solution of 1.99 BV/hr and a contact time of 30.19 minutes, the breakthrough capacity for adsorption of cadmium at breakthrough concentration 50 ppb was found to be 16.43 mg/g at 0.1 m/hr flow velocity. "Breakthrough capacity" measures the effective total loading of the peat adsorption sites with cadmium. At this point in time, the cadmium coming off those sites and dispersed back into the aqueous stream is so high that the 50 ppb $Cd^{2+}$ threshold is reached and the sorption medium is spent. The data for this experiment is shown in Table 12 and FIG. 6.

Figure 7:
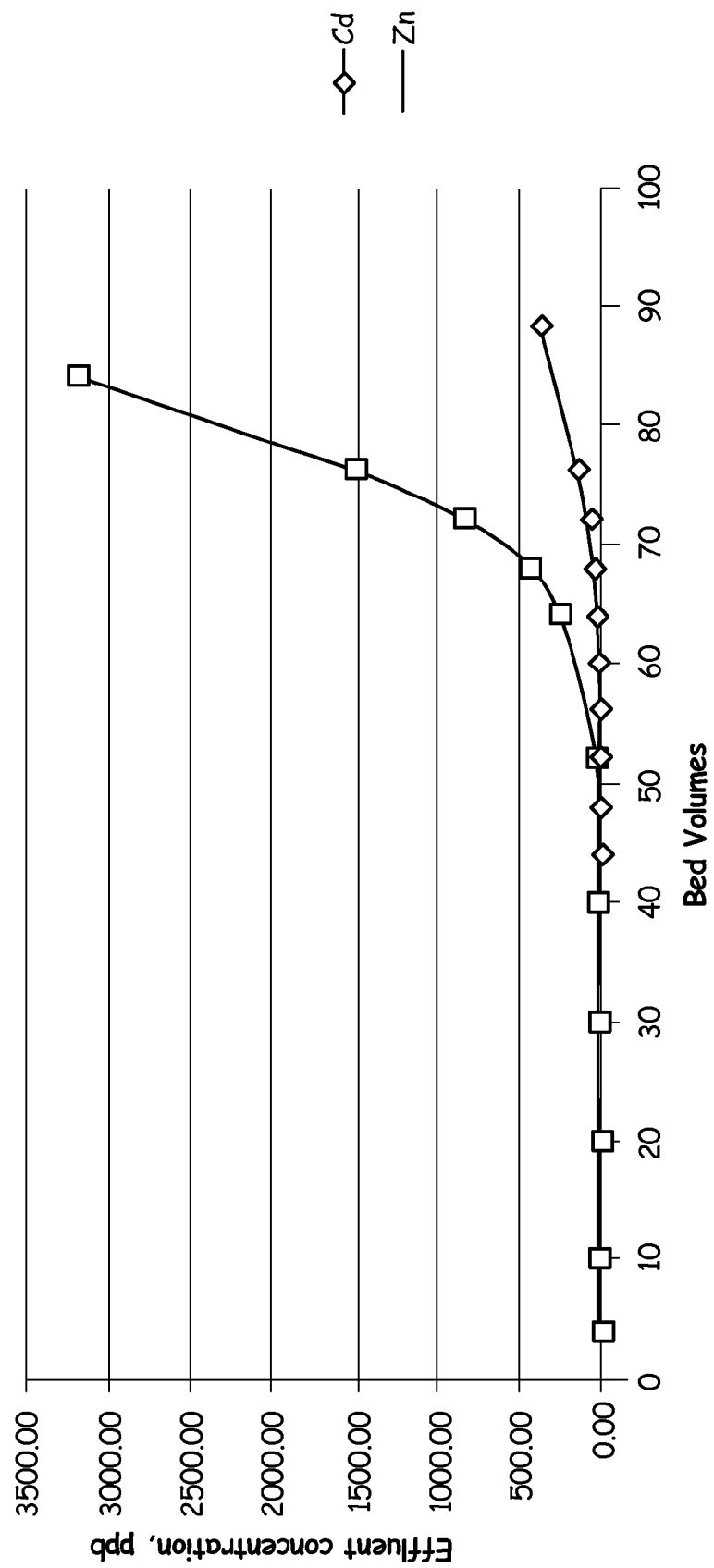
FIG. 7 represents a graphical depiction of the cadmium and zinc adsorptions from an effluent aqueous solution stream containing both cadmium and zinc cations using a sodium-loaded sorption medium of the present invention.

6 ppm cadmium and 30 ppm zinc was prepared by dissolving cadmium chloride and zinc sulfate in Type I deionized water (18.2 MOhm). Na-APTsorb III peat granules were loaded into the column having a column diameter of 6.2 cm, a bed depth of 10 cm, and a bed volume of 301.91 cm$^3$. Employing a flow rate for the cadmium/zinc aqueous solution of 3.97 BV/hr, the breakthrough capacity for adsorption of cadmium at breakthrough concentration 50 ppb was found to be only 0.89 mg/g at 0.4 m/hr flow velocity. The data for this experiment is shown in Table 13 and FIG. 7. This demonstrates the unwanted competition by the zinc cations for the active sites on the sodium-loaded peat granules to the exclusion of cadmium adsorption during the treatment process, which resulted in the breakthrough capacity for the sodium-loaded peat granule sorption medium falling from 16.43 mg/g to 0.89 mg/g. This represents a problem for treatment of aqueous solutions using the sodium-loaded peat granule sorption medium to remove the $Cd^{2+}$ cations where $Zn^{2+}$ cations are present.

TABLE 12

| Granules | Cd feed grade, ppm | Flow rate, ml/min | $m_{granules}$, g | Column diameter, cm | Bed depth, cm | Bed volume, cm$^3$ | Flow rate, BV/hr | Flow velocity, m/hr | Contact time, min | Number of treated BV | Breakthrough capacity at 50 ppb, mg/g |
|---|---|---|---|---|---|---|---|---|---|---|---|
| Na-APTsorb III | 6 | 5 | 72 | 6.2 | 5 | 150.95 | 1.99 | 0.10 | 30.19 | 1306 | 16.43 |

With waste waters containing high concentrations of cadmium, there is a coefficient that will define this equilibrium

TABLE 13

| Zn feed grade, ppm | Cd feed grade, ppm | Flow rate, ml/min | $m_{granules}$, g | Column diameter, cm | Bed depth, cm | Bed volume, cm$^3$ | Flow rate, BV/h | Flow velocity, m/h | Capacity Zn, mg/g | Breakthrough capacity at 50 ppb, mg/g |
|---|---|---|---|---|---|---|---|---|---|---|
| 29.3 | 5.8 | 20 | 148 | 6.2 | 10.00 | 301.91 | 3.97 | 0.40 | 4.49 | 0.89 |
| 33 | 5.3 | 1 | 63.11 | 2.54 | 21.59 | 109.40 | 0.55 | 0.12 | 7.01 | 1.13 | adsorption by the peat granules for $Cd^{2+}$. This ultimately controls the 16.43 mg/g breakthrough capacity value.

But, if the aqueous solution contains a second metal cation like zinc ($Zn^{2+}$), which frequently occurs in waste waters, then the presence of the $Zn^{2+}$ cations will retard the adsorption capacity of the peat granule sorption medium for the $Cd^{2+}$ cations. Because the $Zn^{2+}$ cations usually appear in the waste water solution at higher concentrations than the $Cd^{2+}$ cations, the $Zn^{2+}$ cations occupy many of the active sites on the peat granules to the exclusion of $Cd^{2+}$ adsorption. This problem is demonstrated in Experiment 13 below:

Experiment 13

Determining the Adsorption Capacity for Cadmium in the Presence of Zinc B the Sodium Cation-Loaded Sorption Medium Using the General Column Procedure described above, a synthetic solution of cadmium and zinc with concentrations In a second experiment, a different column having a 2.54 cm diameter, 21.59 bed depth, and 109.40 bed volume was employed with the same Na-APTsorb sorption medium. While the aqueous cadmium/zinc solution was substantially similar to the concentrations of the $Cd^{2+}$ and $Zn^{2+}$ cations found in the aqueous solution used in the first experiment described above, the flow velocity was slowed down to 0.12 min/r, resulting in greater contact time by the aqueous solution with the peat granules. Even so, the breakthrough capacity for $Cd^{2+}$ at 50 ppb was measured as only 1.13 mg/g, which is still substantially lower than the 16.43 mg/g breakthrough value for the cadmium-only aqueous solution used in Experiment 12.

In order to solve this problem of substantially decreased adsorption capacity of the sorption medium for $Cd^{2+}$ cations, $Zn^{2+}$ cations instead of $Na^+$ cations can be placed on the active sites of the peat material during the salt solution treatment step 36 described above. Thus, a zinc-based compound like $ZnCl_2$ or $ZnSO_4$ should be substituted for the NaCl previously described for this salt solution treatment step. The presence of these $Zn^{2+}$ cations on the active sites of the peat granules will alter the coefficient that defines the equilibrium and influences the adsorption capacity more in favor of $Cd^{2+}$ adsorption by the sorption medium at the expense of $Zn^{2+}$ adsorption. This will allow the end user to target $Cd^{2+}$ adsorption to leave more of the $Zn^+$ cations in the aqueous solution during the treatment process by means of selecting a sorption medium for which a special preselected solution of soluble salts was used that favors Reaction I over Reaction II.

For purposes of this invention, this special preselected solution of soluble salts comprises any compound having a cation constituent and an anion constituent where:

the cation constituent is selected from the group consisting of any $1^+$ or $2^+$ cation of, e.g., ammonium ($NH_4^+$), ammonium groups ($NR_4^+$), potassium, lithium, cesium, beryllium, magnesium, calcium, barium, manganese, copper, zinc, strontium, iron, or lead; and the anion constituent is selected from the group consisting of $SO_4^{2-}$, $SO_3^{2-}$, $NO_3^-$, $NO_2^-$, $PO_4^{2-}$, $Cl^-$, $I^-$, $Br^-$, $F^-$, $HCOO^-$, $CH_3COO^-$, $C_2H_5COO^-$, $C_3H_7COO^-$, $C_4H_9COO^-$, $ClO_4^-$, $HCO_3^-$, or $CO_3^{2-}$.

Because these particular cations represent less toxic metals, their placement on the active sites of the sorption medium via the salt solution treatment step 36 to enable the sorption medium to adsorb a major toxic metal like cadmium, while leaving most of the less toxic metals in the aqueous solution during the treatment process will produce a much greater adsorption capacity of the sorption medium for the major toxic metal, as measured by the breakthrough capacity. This modified salt solution treatment step for the sorption medium using the preselected solution of soluble salts should result in an improved breakthrough capacity for cadmium up to 16.43 mg/g at 50 ppb of the major toxic metal.

This modified process for preparing the sorption medium using the preselected solution of soluble salts compound is demonstrated in Example 14 below:

EXAMPLE 14

Preparation of Modified Sorption Medium Using a Preselected Metal Cation Salt Compound The process used to produce a Zn form of the APTsorb II material is illustrated as follows:

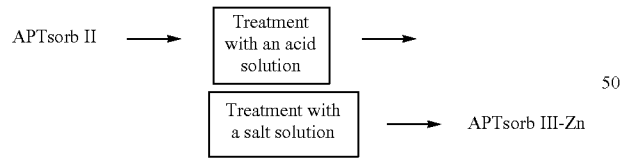

A 2 L volume of a 1N solution of HCl was added to 1 kg of the APTsorb II media at room temperature. The mixture was kept at room temperature for 24 hrs with periodic shaking in such a fashion so as not to destroy the granules. The pH was maintained at a value of 2 or lower. This acid treatment was completed when the concentration of calcium, manganese and other bivalent ions reached maximum concentrations in the solution as determined by the titration procedure described below. The mixture was filtered and washed six times with water or until the test for the presence of chloride ions in the filtrate, as described below, was negative. The volume of combined acid and rinsing solutions was 11 L.

Following the acid treatment, 5 L of 1M solution of $ZnSO_4$ was added to the media, and the mixture was heated at 80-100° C. for 90 minutes. Following the heating period, the mixture was filtered while it was still hot and washed with water until the test for the presence of chloride and sulfate ions in the filtrate was negative.

The solid part was dried at 105° C. for 24 hrs to yield 760 g of thermally-activated and chemically-treated granular peat media called APTsorb III-Zn.

The above specification, drawings, examples, and data provide a complete description of the thermally-activated, chemically-treated sorption media and associated preparation method of the present invention. Since many embodiments of the invention can be made without departing from the spirit and scope of the invention, the invention resides in the claims hereinafter appended.

We claim:

1. A process for the production from partially decomposed organic matter of a sorption media for use in the treatment of aqueous solutions to remove at least one type of aqueous contaminant, comprising the steps of:

(a) supplying an amount of the partially decomposed organic matter to a granulating machine;

(b) granulating the partially decomposed organic matter;

(c) drying the granules;

(d) thermally activating the granules without chemical activation using an activation heat medium at a temperature of about 175-287° C., wherein the granule has a Ball-Pan Hardness number of about 75%-100% and is suitable for sorption of the aqueous contaminant found in the aqueous solution; and (e) chemically treating the thermally-activated granule, comprising:

(i) treatment of the granule with an acid solution to dissolve out the mineral form of at least one type of media contaminant naturally found in the partially decomposed organic matter starting material to place the mineral form of the media contaminant into the acid solution and onto the active sorption sites in the granule followed by separation of the acid solution containing the dissolved mineral form of the media contaminant from the granule;

(ii) followed by treatment of the resulting acid-treated granule with a salt solution preselected in the form of a soluble salt compound having a cation constituent and an anion constituent, wherein:

(A) the cation constituent of the salt solution is selected from the group consisting of any $1^+$ or $2^+$ cation of, e.g., ammonium ($NH_4^+$), ammonium groups ($NR_4^+$), sodium, potassium, lithium, cesium, beryllium, magnesium, calcium, barium, manganese, copper, zinc, strontium, iron, and lead;

(B) the anion constituent of the salt solution is selected from the group consisting of $SO_4^{2-}$, $SO_3^{2-}$, $NO_3^-$, $NO_2^-$, $PO_4^{2-}$, $Cl^-$, $I^-$, $Br^-$, $F^-$, $HCOO^-$, $CH_3COO^-$, $C_2H_5COO^-$, $C_3H_7COO^-$, $C_4H_9COO^-$, and $ClO_4^-$;

(C) the chemical treatment of the granule with the salt solution places the selected cations provided by the cation constituent of the salt solution onto the active adsorption sites in the granule to displace the media contaminant off the active sorption sites in the granule and into the salt solution;

(f) wherein the thermally-activated and chemically-treated granules can sorb the aqueous contaminant from the aqueous solution without introducing the media contaminant into the treated aqueous solution.

2. The process of claim 1, wherein the partially decomposed organic matter is selected from the group consisting of compost media, livestock manure, sewage sludge, and combinations thereof.

3. The process of claim 2, wherein the partially decomposed organic matter is compost media.

4. The process of claim 3, wherein the compost media is selected from the group consisting of leaf compost media, peat, plant by-products, and combinations thereof.

5. The process of claim 1, wherein the aqueous solution comprises a water-based solution containing an environmental impurity as a solute produced by manufacturing, agricultural, or mining industries, or population communities.

6. The process of claim 1, wherein the aqueous contaminant comprises a chemical element or compound found in an aqueous solution that poses a health risk to humans or animals, or is subject to environmental laws or regulations.

7. The process of claim 6, wherein the aqueous contaminant comprises heavy metals like arsenic, lead, mercury, cadmium, manganese, iron, zinc, nickel, copper, molybdenum, cobalt, chromium, palladium, stannum, or aluminum; forms of cesium or uranium; sulfates, phosphorous, selenium, boron, ammonia, refrigerants, and radon gases.

8. The process of claim 1 further comprising screening the partially decomposed organic matter to remove unwanted particles before granulating.

9. The process of claim 8 further comprising admixing additives with the partially decomposed organic matter after screening.

10. The process of claim 9, wherein the additives are selected from the group consisting of binders, pH adjusters, and combinations thereof.

11. The process of claim 1, wherein the granule temperature during the drying step is conducted at a temperature of about 80-400° C.

12. The process of claim 11, wherein the moisture level of peat granules is reduced within the drying step from about 40% wt. to about 10-14% wt.

13. The process of claim 1, wherein the granules are thermally activated in an inert environment.

14. The process of claim 1 wherein the activation heat medium comprises steam or carbon dioxide, nitrogen or other inert media, or combinations thereof at a temperature of about 175-287° C. until the desired level of hardness and activation is achieved.

15. The process of claim 1, wherein the thermal activation step for the granule is carried out at a temperature of about 200-275° C.

16. The process of claim 1, wherein the granule has a Ball-Pan Hardness of about 80-98%.

17. The process of claim 1, wherein the acid solution comprises a solution of hydrochloric acid, formic acid, acetic acid, sulfuric acid, nitric acid, or phosphoric acid.

18. The process of claim 1 further comprising rinsing of the chemically-treated granule with water or other suitable substance after the salt solution treatment step to remove the residual salt solution or any remaining media contaminant from the granule.

19. The process of claim 1 further comprising rinsing the chemically-treated granule with water or other suitable substance after the acid solution treatment step to remove the residual acid solution or any media contaminant from the granule.

20. The process of claim 1, wherein the sorption media comprises a cation-exchange media, an adsorption media, or an absorption media.

21. A process for the production of a chemically-treated sorption media made from partially decomposed organic matter for use in the treatment of aqueous solutions to remove at least one type of aqueous contaminant, comprising the steps of:
 (a) supplying an amount of a thermally-activated, granulated, partially decomposed organic matter that was not chemically activated;
 (b) chemically treating the thermally-activated granule, comprising:
  (i) treatment of the granule with an acid solution to dissolve out the mineral form of at least one type of media contaminant naturally found in the partially decomposed organic matter starting material to place the mineral form of the media contaminant into the acid solution and onto the active sorption sites in the granule followed by separation of the acid solution containing the dissolved mineral form of the media contaminant from the granule;
  (ii) followed by treatment of the resulting acid-treated granule with a salt solution preselected in the form of a soluble salt compound having a cation constituent and an anion constituent, wherein:
   (A) the cation constituent of the salt solution is selected from the group consisting of any $1^+$ or $2^+$ cation of, e.g., ammonium ($NH_4^+$), ammonium groups ($NR_4^+$), sodium, potassium, lithium, cesium, beryllium, magnesium, calcium, barium, manganese, copper, zinc, strontium, iron, and lead;
   (B) the anion constituent of the salt solution is selected from the group consisting of $SO_4^{2-}$, $SO_3^{2-}$, $NO_3^-$, $NO_2^-$, $PO_4^{2-}$, $Cl^-$, $I^-$, $Br^-$, $F^-$, $HCOO^-$, $CH_3COO^-$, $C_2H_5COO^-$, $C_3H_7COO^-$, $C_4H_9COO^-$, and $ClO_4^-$;
   (C) the chemical treatment of the granule with the salt solution places the selected cations provided by the cation constituent of the salt solution onto the active adsorption sites in the granule to displace the media contaminant off the active sorption sites in the granule and into the salt solution;
 (c) wherein the thermally-activated and chemically-treated granules can sorb the aqueous contaminant from the aqueous solution without introducing the media contaminant into the treated aqueous solution.

22. The process of claim 21, wherein the thermally-activated granule has a Ball-Pan Hardness number of about 75%-100%.

23. The process of claim 22, wherein the thermally-activated granule has a Ball-Pan Hardness of about 80-98%.

24. The process of claim 21, wherein the acid solution comprises a solution of hydrochloric acid, formic acid, acetic acid, sulfuric acid, nitric acid, or phosphoric acid.

25. The process of claim 21 further comprising rinsing of the chemically-treated granule with water or other suitable substance after the salt solution treatment step to remove the residual salt solution or any remaining media contaminant from the granule.

26. The process of claim 21 further comprising rinsing the chemically-treated granule with water or other suitable substance after the acid solution treatment step to remove the residual acid solution or any media contaminant from the granule.

27. The process of claim 21, wherein the sorption media comprises a cation-exchange media, an adsorption media, or an absorption media.

28. The process of claim 21, wherein the partially decomposed organic matter for the thermally-activated granule is selected from the group consisting of compost media, livestock manure, sewage sludge, and combinations thereof.

29. The process of claim 28, wherein the partially decomposed organic matter is compost media.

30. The process of claim 29, wherein the compost media is selected from the group consisting of leaf compost media, peat, plant by-products, and combinations thereof.

31. The process of claim 21, wherein the aqueous solution comprises a water-based solution containing an environmental impurity as a solute produced by manufacturing, agricultural, or mining industries, or population communities.

32. The process of claim 21, wherein the aqueous contaminant comprises a chemical element or compound found in an aqueous solution that poses a health risk to humans or animals, or is subject to environmental laws or regulations.

33. The process of claim 32, wherein the aqueous contaminant comprises heavy metals like arsenic, lead, mercury, cadmium, manganese, iron, zinc, nickel, copper, molybdenum, cobalt, chromium, palladium, stannum, or aluminum; radioactive forms of cesium or uranium; sulfates, phosphorous, selenium, boron, ammonia, refrigerants, and radon gases.

34. A sorption medium prepared from partially decomposed organic matter for use in the treatment of aqueous solutions to remove an aqueous contaminant from the aqueous solution without introducing into the aqueous solution a media contaminant naturally found in the partially decomposed organic matter, said sorption medium comprising thermally-activated, chemically-treated granules of the partially decomposed organic matter having a Ball-Pan Hardness number of about 75-90% that were chemically treated with:
  (a) an acid solution to dissolve out the mineral form of the media contaminant naturally found in the partially decomposed organic matter starting material to place the mineral form of the media contaminant into the acid solution and onto the active sorption sites in the granule followed by separation of the acid solution containing the dissolved mineral form of the media contaminant from the granule; and
  (b) subsequently with a salt solution preselected in the form of a soluble salt compound having a cation constituent and an anion constituent, wherein:
    (i) the cation constituent of the salt solution was selected from the group consisting of any $1^+$ or $2^+$ cation of, e.g., ammonium ($NH_4^+$), ammonium groups ($NR_4^+$), sodium, potassium, lithium, cesium, beryllium, magnesium, calcium, barium, manganese, copper, zinc, strontium, iron, and lead;
    (ii) the anion constituent of the salt solution was selected from the group consisting of $SO_4^{2-}$, $SO_3^{2-}$, $NO_3^-$, $NO_2^-$, $PO_4^{2-}$, $Cl^-$, $I^-$, $Br^-$, $F^-$, $HCOO^-$, $CH_3COO^-$, $C_2H_5COO^-$, $C_3H_7COO^-$, $C_4H_9COO^-$, and $ClO_4^-$;
    (iii) the chemical treatment of the granule with the salt solution placed the selected cations provided by the cation constituent of the salt solution onto the active adsorption sites in the granule to displace the media contaminant off the active sorption sites in the granule and into the salt solution.

35. The sorption medium of claim 34, wherein 95% of the granules have a size distribution of about 16-50 mesh.

36. The sorption medium of claim 34, wherein when the granules are used to treat an aqueous solution having a 30,000 ppb cadmium concentration, the residual level of cadmium ions remaining in the aqueous solution is about 50-200 ppb.

37. The sorption medium of claim 34, wherein when the granules are used to treat an aqueous solution having a cadmium concentration over time after reaching equilibrium at 50 ppb of cadmium in the solution, the loading capacity for cadmium ions adsorbed by the granules is about 10-20 mEq/100 g.

38. The sorption medium of claim 34, wherein when the granules are used to treat an aqueous solution having an almost unlimited cadmium dosing concentration, the maximum measured loading capacity for cadmium ions on the granules is about 35-50 mEq/100 g.

39. The sorption medium of claim 34, wherein when the granules are used to treat an aqueous solution having a 30,000 ppb cadmium concentration, the amount of manganese ions leaching from the granules into the aqueous solution does not exceed about 5 ppb.

40. The sorption medium of claim 34 further comprising admixing additives with the partially decomposed organic matter after screening.

41. The sorption medium of claim 40, wherein the additives are selected from the group consisting of binders, pH adjusters, and combinations thereof.

42. The sorption medium of claim 34, wherein the partially decomposed organic matter is selected from the group consisting of compost media, livestock manure, sewage sludge, and combinations thereof.

43. The sorption medium of claim 42, wherein the compost media is selected from the group consisting of leaf compost media, peat, plant by-products, and combinations thereof.

44. The sorption medium of claim 43, wherein the compost media is leaf compost media.

45. The sorption medium of claim 43, wherein the compost media is peat.

* * * * *